United States Patent
Negahdar et al.

(10) Patent No.: US 11,539,680 B2
(45) Date of Patent: Dec. 27, 2022

(54) METHOD AND APPARATUS FOR PROVIDING SECURE SHORT-LIVED DOWNLOADABLE DEBUGGING TOOLS

(71) Applicant: ARRIS Enterprises LLC, Suwanee, GA (US)

(72) Inventors: Ali Negahdar, Duluth, GA (US); Marc Rizo, Johns Creek, GA (US); Wade E. Carter, Suwanee, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 127 days.

(21) Appl. No.: 17/160,717

(22) Filed: Jan. 28, 2021

(65) Prior Publication Data
US 2021/0306309 A1    Sep. 30, 2021

Related U.S. Application Data

(60) Provisional application No. 63/000,741, filed on Mar. 27, 2020.

(51) Int. Cl.
*H04L 29/06* (2006.01)
*H04L 9/40* (2022.01)
(Continued)

(52) U.S. Cl.
CPC .......... *H04L 63/068* (2013.01); *H04L 9/0643* (2013.01); *H04L 9/0869* (2013.01);
(Continued)

(58) Field of Classification Search
CPC ... H04L 63/068; H04L 9/0643; H04L 9/0869; H04L 9/3263; H04L 63/0435; H04L 63/083

See application file for complete search history.

(56) References Cited

U.S. PATENT DOCUMENTS

| 8,281,136 B2 * | 10/2012 | Ramakrishna | .......... H04L 9/083 713/172 |
| 9,325,506 B2 * | 4/2016 | Jones | .................... G06F 21/575 |

(Continued)

FOREIGN PATENT DOCUMENTS

| CN | 111046436 A | * | 4/2020 |
| WO | 2018/222791 | | 12/2018 |

OTHER PUBLICATIONS

International Search Report and the Written Opinion of the International Searching Authority dated Apr. 1, 2021 in International (PCT) Application No. PCT/US2021/015392.

*Primary Examiner* — Shawnchoy Rahman
(74) *Attorney, Agent, or Firm* — Wenderoth, Lind & Ponack, L.L.P.

(57) ABSTRACT

A system and method for providing remote access to a device is disclosed. The method comprises receiving an automatically expiring authentication token having encrypted authentication token data including a session key from the device, transmitting the authentication token to secure facility, receiving the decrypted authentication token data from the secure facility, signing a tool package with a package verification key derived at least in part from the session key, the tool package comprising processor instructions providing remote access to the device when executed by the processor, providing the signed tool package to the device. The device verifies the signed tool package using the package verification key and executes the tool package only if the signature of the tool package is verified.

20 Claims, 19 Drawing Sheets

(51) Int. Cl.
*H04L 9/06* (2006.01)
*H04L 9/08* (2006.01)
*H04L 9/32* (2006.01)

(52) U.S. Cl.
CPC ........ *H04L 9/3263* (2013.01); *H04L 63/0435* (2013.01); *H04L 63/083* (2013.01)

(56) References Cited

U.S. PATENT DOCUMENTS

| | | | | |
|---|---|---|---|---|
| 2011/0016311 A1* | 1/2011 | Durand | ................ | H04L 9/0836 |
| | | | | 713/155 |
| 2015/0095648 A1* | 4/2015 | Nix | ...................... | H04L 9/3239 |
| | | | | 713/170 |
| 2018/0351926 A1 | 12/2018 | Negahdar | | |
| 2018/0351927 A1 | 12/2018 | Negahdar | | |

* cited by examiner

*1500*

| Signed/ Unsigned | Field Name | Size in bytes | Description |
|---|---|---|---|
| Signed | Magic_Text | 8 | Value=ARRIS_MF. This identifies the beginning of the manifest |
| | Manifest_Size | 4 | This is the total size of the manifest, including the appended signature. In case something is after this manifest, parsers not interested in this manifest can use this field to skip over. This will always be 256. |
| | Manifest_Version | 4 | Defines the version number of the manifest, initially 1. This may be incremented in future manifests when Reserved bytes are allocated for use. |
| | Package_Hash | 32 | SHA256 hash of the Package. |
| | Package_Size | 4 | Size of Package. |
| | Signed_Reserved | 44 | Reserved for future use. All bytes must be set to zero for Manifest Version 1. |
| Unsigned | Manifest_Signature | 32 | HMAC-SHA256 of the signed portion of the manifest |

1502 — (Signed rows)
1504 — (Unsigned row)

*FIG. 15*

METHOD AND APPARATUS FOR PROVIDING SECURE SHORT-LIVED DOWNLOADABLE DEBUGGING TOOLS

BACKGROUND OF THE INVENTION

1. Technical Field

The present invention relates to systems and methods for configuring consumer premises equipment, and in particular to a system and method for remotely configuring consumer premises equipment with secure short lived debugging tools.

2. Description of the Related Art

It is desirable to provide data service to customers. Such data services may be provided via wireless or wired transmission. Wireless data services may be use terrestrial transmission, airborne transmission, or satellite-based transmission. Wired data services may use phone lines (dial up or DSL) or fiber optics.

Data services are typically provided by a multiple system operator (MSO). Exemplary MSOs include traditional MSOs such as direct-broadcast satellite television providers cable television providers as well internet service providers. The data services are typically provided via customer premises equipment (CPE) that is installed in the customer's premises, such as a cable modem or set top box (STP). In many instances, the CPE itself or the conditional access system (CAS) portions of the CPE is sourced by a CPE provider.

It is desirable for MSOs to have the capability to remotely configure or reconfigure CPE in a secure way. Part of this process is enabling a point of entry into the CPE (e.g. via a secure shell (SSH) or hypertext transfer protocol (HTTP)) remotely or securely.

Once the CPE is configured to enable the point of entry, information exchanged on that point of entry must be secured. In an SSH point of entry, an SSH server (in this case, the CPE) publishes its public key in a secure public key DB/LDAP (lightweight directory access protocol). The SSH client (in this case, a processor at the MSO) can get the public key offline securely from the trusted database and can store it locally so it can use to validate the SSH server. This works well in an environment where the number of SSH servers is very limited and the SSH client can retrieve the SSH server key securely offline. Alternatively, the SSH server public key may be received during a handshake between the SSH server and the SSH client. With this approach, the SSH client has to blindly accept the SSH server public key and store it in its database. This is not a secure approach and the server public key is not validated. In a large scale CPE deployment where each CPE acts as an SSH server, an SSH client will have to take CPE SSH server public key blindly during the SSH handshake, which is not secure. Accordingly, it is desirable to provide for a means for the SSH client to validate the CPE SSH public key in an architecture having a large number of deployed CPEs.

Another CPE point of entry is a Simple Network Management Protocol (SNMP) compliant point of entry. SNMP is a protocol for network management that is used for collecting information from, and configuring, network devices, such as servers, printers, hubs, switches, routers on an Internet Protocol (IP) network, and CPE devices. SNMP includes three versions. SNMPv1 is the initial implementation of the SNMP protocol. SNMPv2 revised version one with improvements in performance, security, confidentiality, and manager-to-manager communications. SNMPv3 adds cryptographic security to SNMPv1 and SNMPv2. SNMPv3 includes provision for key localization which attempts to provide unique keys to all authoritative SNMP engines in the network. However, such key localization uses a single password to derive keys for the entire network. Accordingly, if the single password is compromised, the entire network is compromised.

Further, at times, it is desirable to remotely resolve problems with remotely deployed CPE by downloading debugging tools that allow remote access to the CPE itself. However, in such cases, those debugging tools may be used by those wishing to obtain unauthorized access to or control of the CPE. Accordingly, it is desirable to remove all such debugging tools from firmware or other memory of the CPE once such tools are no longer required, particular such tools that enable remote access or control of the CPE. For example, an MSO or CPE manufacturer may require that the secure shell (SSH) be removed from the device which would result in permanent loss of access to the fielded CPE. A problem may later arise with the fielded CPE when the CPE manufacturer or MSO requires remote access to the CPE to debug CPE problems, but the CPE does not include any debugging tools that allow remote access.

SUMMARY OF THE INVENTION

To address the requirements described above, this document discloses an apparatus, method and system for providing remote access to a device including a processor, including: One embodiment is evidenced by receiving an automatically expiring authentication token having encrypted authentication token data including a session key from the device; transmitting the authentication token to secure facility; receiving the decrypted authentication token data from the secure facility; signing a tool package with a package verification key derived at least in part from the session key, the tool package including processor instructions providing remote access to the device when executed by the processor; providing the signed tool package to the device; wherein the device: verifies the signed tool package using the package verification key; and executes the tool package only if the signature of the tool package is verified.

Implementations may include one or more of the following features:

Any of the methods described above, method further including deriving the package verification key, including: generating a first value k1 from a hash of the session key; generating a second value k2 from a hash of the first value k1; and generating the package verification key from a concatenation of the first value k1 and the second value k.

Any of the methods described above, wherein the first value k1 includes a least significant part of the package verification key and the second value k2 includes a most significant part of the package verification key.

Any of the methods described above, wherein signing a tool package with the package verification key derived at least in part from the session key includes: generating a hash of the tool package; generating a manifest having the hash of the tool package; generating a signature of the manifest using the package verification key; appending the signature of the manifest to the manifest; and appending the tool package to the manifest.

Any of the methods described above, method wherein: the automatically expiring encrypted authentication token is generated by the device, by generating, by the device, token data including: the session key; validity period, the authentication token being only valid during the validity period. The method may also include storing the token data in trusted storage of the device.

The methods may also include encrypting, by the device, the token data according to a random symmetric key (AEK) generated by the device.

The methods may also include encrypting the AEK with a public key associated with a private key securely stored in a remote facility. The method may also include generating the authentication token having the encrypted AEK and the encrypted token data.

Any of the methods described above, wherein: the token data further includes one or more passwords; and the method further includes: enabling logging in to the device by providing the one or more passwords. The method wherein. The method may also include a new AEK is generated by the device each time a new encrypted authentication token is generated.

Any of the methods described above, wherein the public key is received in a configuration file and stored in the trusted storage.

Any of the methods described above, further comprising receiving a configuration file; determining if the configuration file includes the public key; if the received configuration file does not include the public key, disabling login access to the device; if the received configuration file includes the public key, comparing the public key in the received configuration file with a public key stored in trusted storage of the device; if public key in storage is different than public key in configuration file, replace public key in trusted storage of the device with public key of configuration file and regenerate authentication token.

Any of the methods described above, wherein: the device includes a processor and a memory storing a firmware image having instructions for performing processor operations; and the public key is stored in the firmware image.

Any of the methods described above, wherein: the tool package executed from a random access memory (RAM) communicatively coupled to the processor; and the method further includes removing the tool package from the ram.

Any of the methods described above, wherein removing the tool package from ram includes: determining if the device has been rebooted; and if the device has been rebooted, removing the tool package from ram.

Any of the methods described above, wherein the tool package is removed by a delete command via an application program interface of the device.

Another embodiment is evidenced by an apparatus for providing remote access to a device including a processor, including: a first processor; a memory, communicatively coupled to the first processor, the memory storing first processor instructions including instructions for: receiving an automatically expiring authentication token having encrypted authentication token data including a session key from the device; transmitting the authentication token to secure facility; receiving the decrypted authentication token data from the secure facility; signing a tool package with a package verification key derived at least in part from the session key, the tool package including device processor instructions providing remote access to the device when executed by the device processor; providing the signed tool package to the device; wherein the device: verifies the signed tool package using the package verification key; and executes the tool package only if the signature of the tool package is verified.

BRIEF DESCRIPTION OF THE DRAWINGS

Referring now to the drawings in which like reference numbers represent corresponding parts throughout:

FIG. 15 is a diagram illustrating one embodiment of the signed manifest;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A system and method which permits one or more debugging tools along with a remote access component such as SSH to be downloaded to the CPE in the field in a secure manner, and to enable those tools for only a configurable limited time. The debugging tools are downloadable over any open network and the CPE can verify the tool before it will accept it. The tool is short lived, has a validity period, and is removed from the CPE when the tool expires (e.g. it is no longer in the validity period). This permits MSOs/CPE providers to develop debugging tools and use a secure mechanism to install debugging tools or any other tools or packages on the CPE. A suite of tools may be developed and licensed or sold to MSO/CPE manufacturers.

Figure 1:
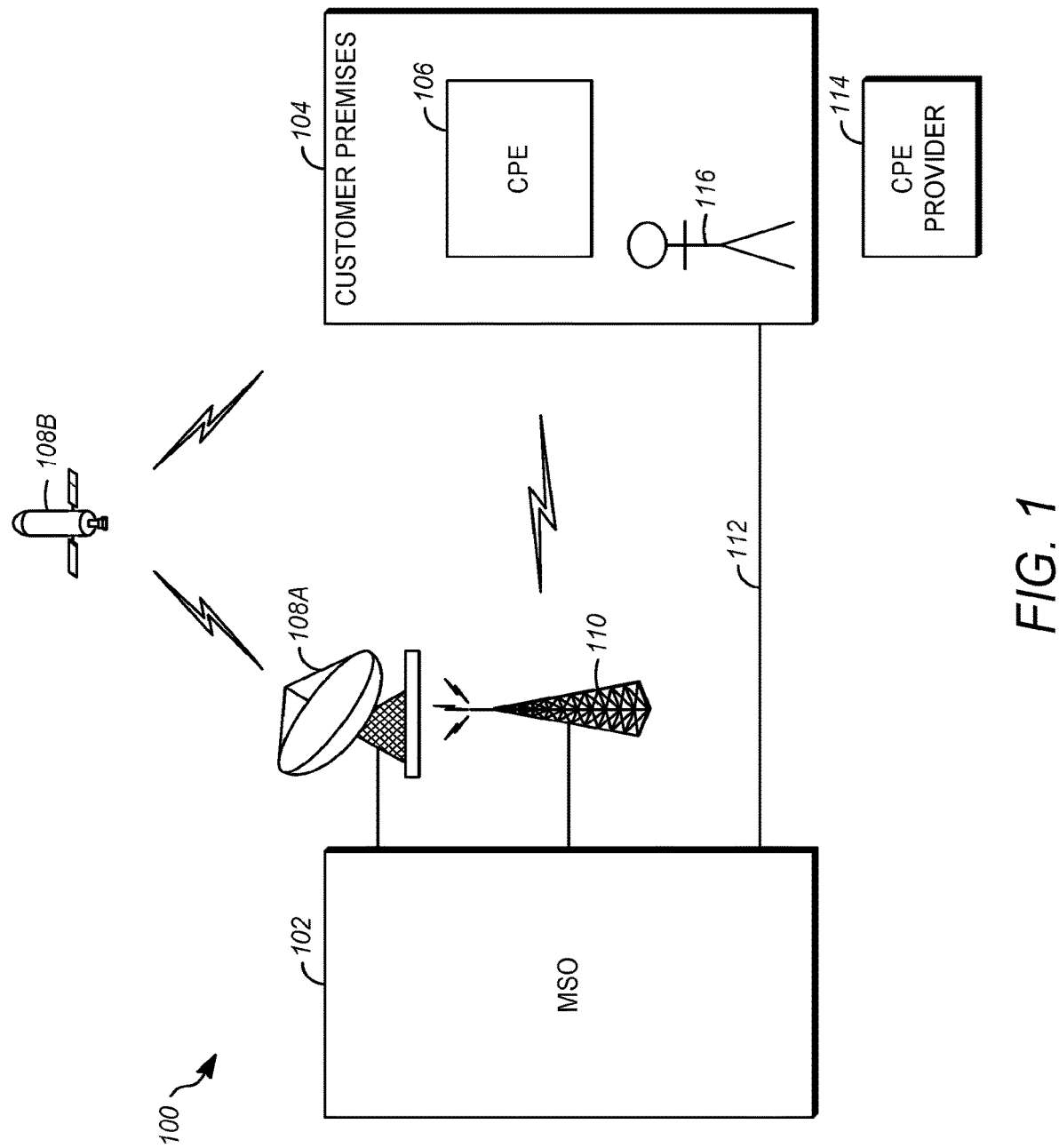
FIG. 1 is a diagram of an exemplary data distribution system.

FIG. 1 is a diagram of an exemplary data distribution system 100. The data distribution system 100 comprises an MSO 102 that transmits information to a plurality of subscribers 116. Each such subscriber 116 is provided CPE 106 such as a STB or cable modem for installation where the data services are to be received. Typically, the CPE is installed in the customer premises 104 such as a home, but the CPE may be installed in motor vehicle or be carried on the user's person. In many instances, the CPEs 106 provided to the users 116 are manufactured (at least in part) by a CPE provider 114. In some embodiments, the CPE provider 114 manufactures CPEs 106 of one hardware design that can be used with different MSOs 102, each having different functional requirements. Typically, this is accomplished through modification of the software and/or firmware of the CPE 106. The CPE provider 114 may also manufacture CPEs 106 with different hardware functionality for different MSOs 102. Typically, the data transmitted between the MSOs 102 and the CPEs 106 is encrypted or otherwise obfuscate it to protect it from being received by unauthorized entities. Consequently, CPEs 106 typically include a conditional access system (CAS) that decrypts the data transmitted by the MSO 102 and may also have the capability to encrypt data transmitted from the CPE 106 to the MSO 102.

The MSO 102 may transmit data via a wired connection 112 such as optical cable or conductive wire. The MSO may also transmit data via a wireless connection such as via a terrestrial transmitter 110 or a satellite broadcast system in which data is transmitted via a ground station 108A and a satellite 108B.

In some cases, the data distribution system 100 also permits the users' CPE 106 to transmit information to the MSO 102. Accordingly, the data distribution permits information to be transceived (e.g. transmitted and received) by both the MSO 102 and the CPE 106. Further, such systems may be asymmetric, with data being transmitted from the MSO 102 to the CPE 106 via one transmission method, and data being transmitted from the CPE 106 to the MSO 102 by another transmission method. For example, it is known for MSOs 102 to transmit media programs to subscribers having CPE 106 via satellite, but data to be transmitted from the CPE 106 to the MSO 102 be transmitted via a wired connection such as 112.

As described above, there is a need for MSOs 102 to be able to access CPE 106. This may be required to provide the CPE with new or different functionality or rights to receive and/or transmit data, or to delete currently existing functionality or rights to receive such data, or to debug problems in the CPE. This presents a need to have a very strong authenticator mechanism. Such an authentication mechanism is subject to the following requirements Uniqueness: The authenticator must be unique to each device.

Life: The authenticator must be random and changed periodically (short lived).

Decentralized Operation: A centralized secure server should not be required to distribute secret data such as passwords to users. This will relive the CPE provider 114 from providing and supporting such a system. Further, a distributed (non-centralized) system makes the system highly available to operators which might include multiple MSOs 102. The system must also permit different MSOs 102 to distribute secret data to different groups of customers 116 (or each customer 116), so the MSO 102 can set up and configure its own security system.

Recovery: The system must be recoverable very quickly and easily if it gets compromised.

Security: The system must not rely on any symmetric key in the software.

Scalability: The system must be scalable, because MSOs 102 may be large or small, and the same system should serve both.

Simplicity: The system must be simple and easy to manage and operate.

Control: The operator must be able to disable the system without CPE firmware update.

Robustness: If the system becomes compromised, it must not require CPE software update and re-spinning of images.

Authentication Tokens

A system and method of controlling CPEs 106 is presented below. This system uses limited access authorization tokens (authtokens) that provide limited access to the CPE interface and are designed to be used by MSOs 102 without the need for CPE provider 114 involvement in the process.

Two different types of authentication tokens are described herein, and each has the same access level:

MSO Authentication token: The MSO authentication token is used on the wide area network (WAN) side when the CPE 106 is able to reset and restart and can obtain its configuration file (which is the case with a high percentage of instances where MSOs 102 require access to the CPE 106).

CPE Provider Tech Support Authentication token: This authentication token is used on the WAN and local area network (LAN) side when the CPE device is not able to reset and restart. With regard to LAN implementations, this is used when the CPE is not able to reboot/restart (R&R). LAN access may also be provided to MSOs through the CPE provider. Since this typically constitutes a very small percentage of the login access required by MSOs 102, the login process can be somewhat manual and not fully automated. In such cases, MSOs 102 can obtain the credential(s) needed to enable the interface and login to that CPE device from the CPE provider 114.

CPE Provider Factory and Repair Authentication Token: This authentication token is used to unlock fused/secure devices at the factory or repair facility for purposes of CPE repair.

Interface Enabler/Disabler

In addition to providing a credential to login to an CPE interface, authentication tokens also provide a secure means to enable or disable one or more of the CPE interfaces before the MSO 102 can login. For example, if the CPE includes an interface or port that is SSH-compliant, the MSO 102 will need to enable the SSH interface (if currently disabled) before using the port to login.

A point of entry (PoE) enabler/disabler token (hereinafter referred to as an EnablerToken) provides a secure mechanism to enable or disable a PoE such as an SSH-compliant port. This is provided in addition to the provision of a credential to log into the PoE.

Figure 2:
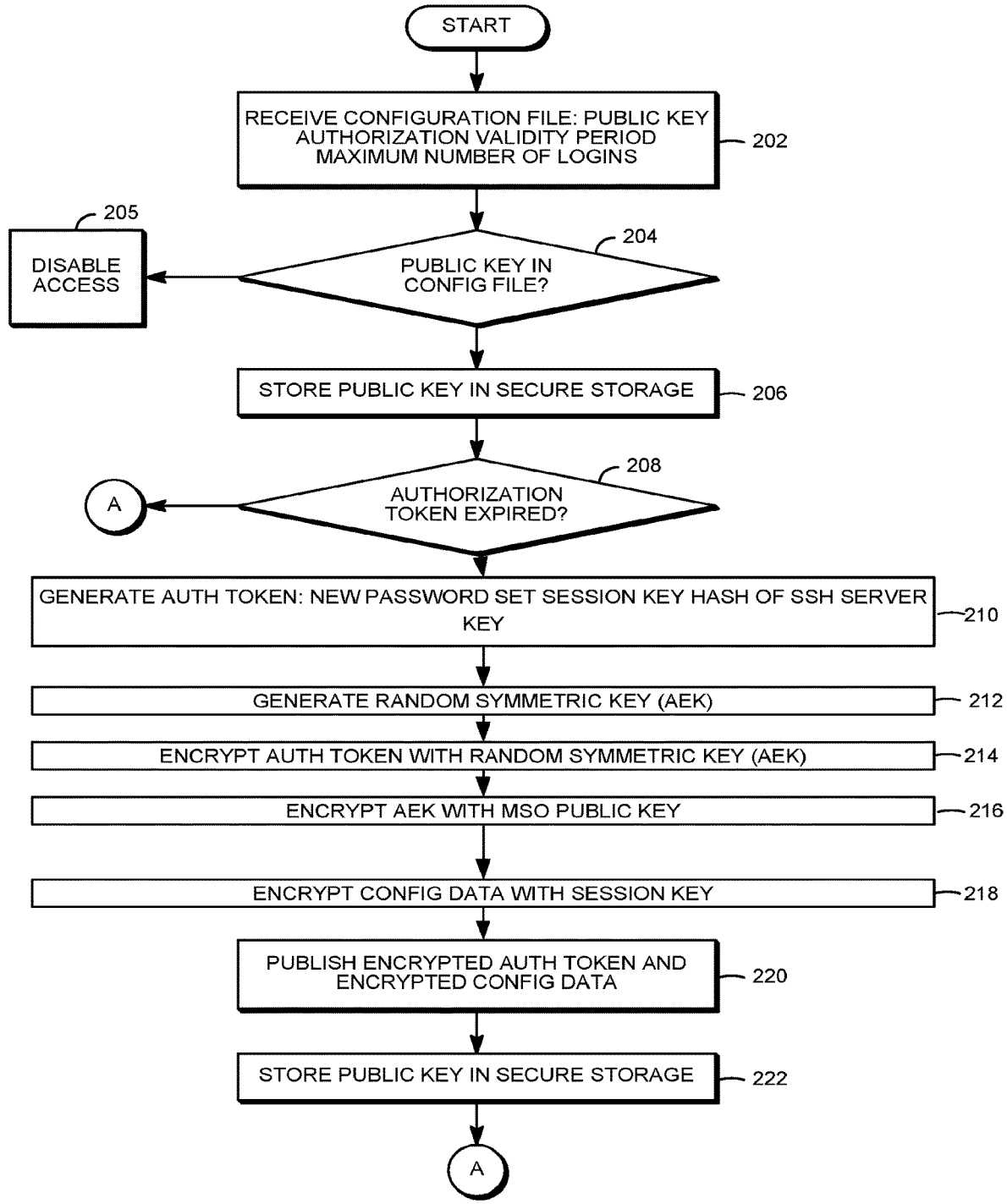
FIG. 2 is a diagram illustrating one embodiment operations used to enable an MSO to use an authentication token to configure customer premises equipment.

FIG. 2 is a diagram illustrating one embodiment operations used to enable an MSO 102 to use an authentication token to configure CPE 106. For exemplary purpose, CPE 106 in this example comprises a cable modem. FIG. 2 is discussed with reference to FIG. 3, which is a diagram further illustrating these operations.

Figure 3:
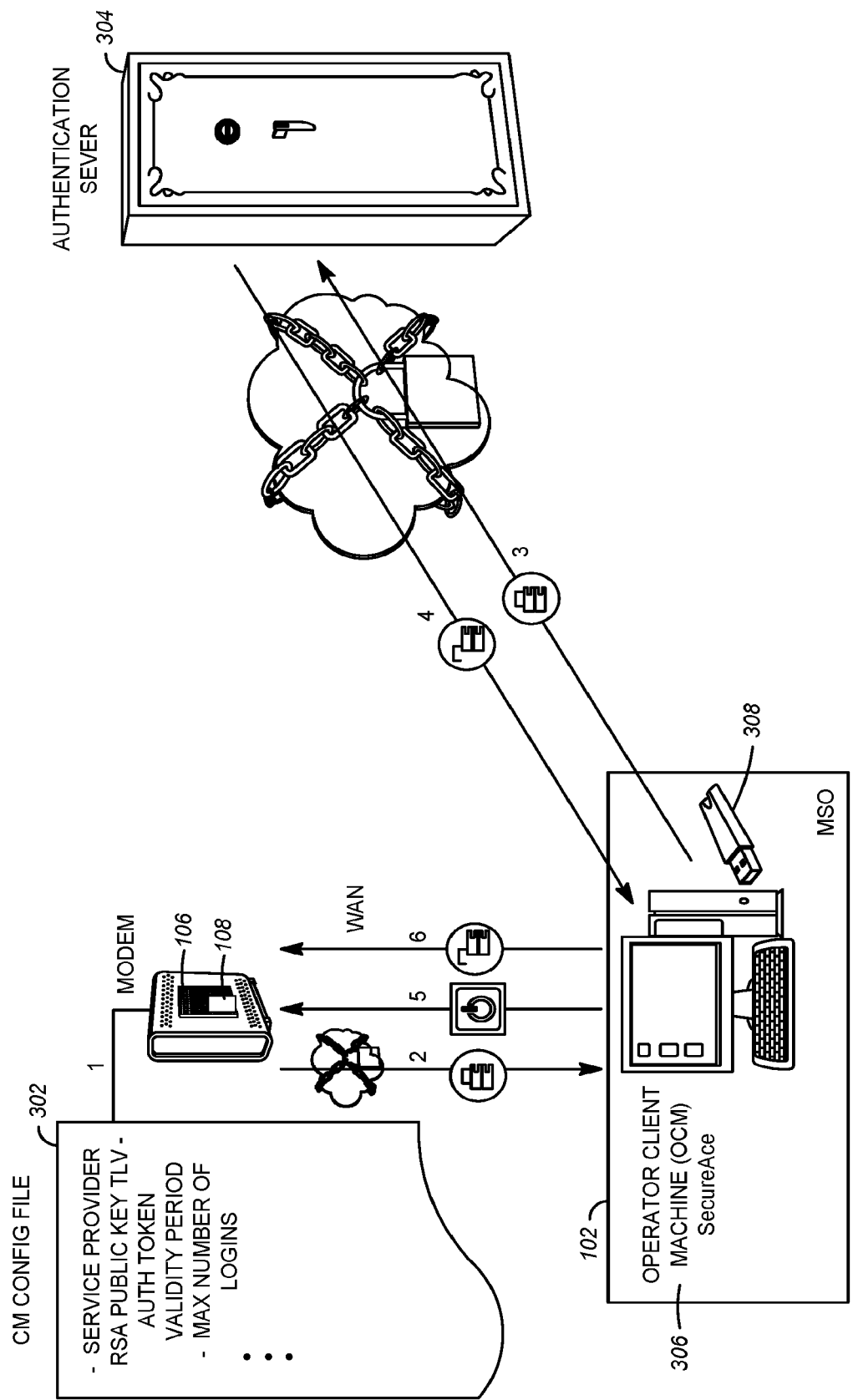
FIG. 3 is a diagram presenting exemplary operations that can be performed by the CPE in support of the use of a limited access authentication token by an MSO.

FIG. 3 is a diagram presenting exemplary operations that can be performed by the CPE 106 in support of the use of a limited access authenticator (authentication token) by an MSO 102.

Referring first to FIG. 2, in block 202, the cable modem 106 receives a configuration file 302 having a public key of the MSO 102 (hereinafter referred to as the MSO public key) and optionally, an authorization validity period and number representing the maximum number of permitted logins using the authentication token. In one embodiment, the MSO public key is an RSA (Rivest-Shamir-Adleman) public key in tag limited value (TLV) format. This may be accomplished by the MSO 102 or the CPE provider 114 downloading the configuration file 302 into the modem 106 in the MSO 102 or CPE provider 114 facility, or may be accomplished remotely. This operation is also shown. As step (1) in FIG. 3. The configuration file is to be distinguished from the configuration data described below. The configuration data comprises data that is used to configure the modem and its interfaces. Such configuration data may be included in the configuration file initially downloaded into the modem 106 to initially configure the modem 106 and its interfaces. However, the configuration data described below to configure or reconfigure modem interfaces is not typically provided as a part of the configuration file referenced above.

The modem 106 determines if the downloaded configuration file 302 includes the MSO public key, as shown in block 204. If the public key is not in the configuration file 302, the modem 106 disables login access to the modem 106. This feature can be used by the MSO 102 to disable access to the modem 106 (e.g. by transmitting a configuration file 302 without a public key), as shown in block 205. If the configuration file 302 includes the MSO public key, processing is routed to block 206, and the received MSO public key is stored in the modem 106 in secure storage 108 (SS) to prevent unauthorized access. In some chipsets, secure storage (SS) 108 is available, and the authentication token 400 and its attributes can be stored in this secure storage 108. On some chipsets, obfuscation can be used to store the authentication token 400 and its attributes, in a manner similar to how modem 106 private keys are obfuscated on such devices.

If the MSO public key received in the configuration file 302 is not the same as the MSO public key currently stored in SS 108, then the newly received MSO public key must replace the one in the SS 108 and the authorization token must be regenerated, as described in block 210 below.

Block 208 determines if an authentication token currently stored in the modem 106 has expired. If the current authentication token stored in the modem SS 108 has expired, the modem 106 generates new authentication token having a new password, as shown in block 210. In one embodiment, a plurality (e.g. a set) of new passwords is generated, with each password corresponding to a different level of access to the modem 106. The modem 106 may also generate a session key (typically 32 bytes) and a hash of the modem's SSH key (hereinafter referred to as the SSH server key). Further, the password, session key, and hash of the SSH server key may be tagged with a validity period, maximum number of logins, and the media access control (MAC) address of the modem 106. The MAC address is a unique identifier assigned to network interfaces for communications at the data link layer of a network segment.

A random symmetric key (AEK) is generated as shown in block 212, and this data is encrypted with a random symmetric key (authentication token encryption key or AEK) as shown in block 214. A new AEK must be generated every time an authentication token is encrypted. The AEK is then encrypted with the MSO public key, as shown in block 216. The authentication token is then appended with the AEK token, to create an authentication token package, which is published as shown in block 220. This publication can be accomplished, for example, via management information base (MIB) or TR-069 (technical specification of that defines an application layer protocol for remote management of customer-premises equipment (CPE) connected to an Internet Protocol (IP) network. The new authentication token parameters are stored in the trusted store or SS 108 of the modem 106, as shown in block 222.

The modem 106 also reads modem configuration data. In one embodiment, the configuration data is expressed in a set of binary values of an enabled interface bitmap (EIB), which describes which of the modem 106 interfaces are enabled. The modem 106 encrypts the configuration data with the session key, as shown in block 218, and produces an encrypted enabler/disabler token Finally, as shown in block 220, the encrypted authorization token is published as the authentication token (illustrated and described further in association with FIG. 7). Such publication can also be accomplished via MIB or TR-069.

Authentication Token

Figure 4A:
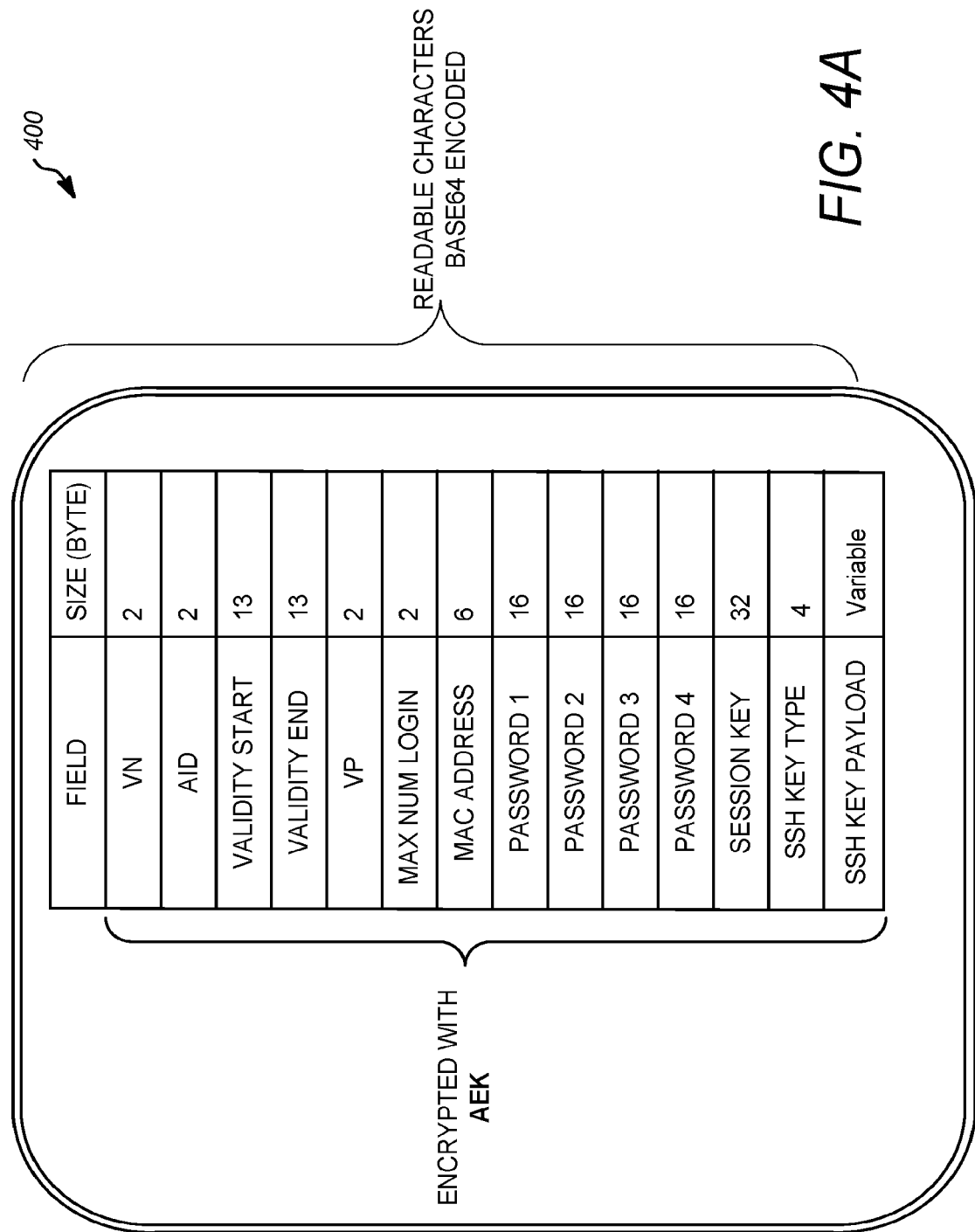
FIGS. 4A, 4B, and 4C are a diagrams presenting an exemplary embodiment of an encrypted authentication token, an encrypted AEK token, and an authentication token package.

FIG. 4A is a diagram presenting an exemplary embodiment of an encrypted authentication token 400. In the illustrated embodiment, the authentication token 400 comprises:

One or more 16 byte passwords of 16 octets: Preferably, each password is a strong password comprising alphanumeric characters and includes special characters (* and & for example). In the illustrated embodiment, there are four passwords, with each password uniquely associated with one of 4 different access level. For each modem 106 interface such as SSH or HTTPS, a password provides a predefined access level that is assigned to that password. Access levels are further described below.

An SSH key payload (described further below).

An SSH key type, which may be of 4 octets. The two most significant octets denote the content type that is in the "SSH Key Payload" field. Content types (denoted by the two most significant octets) and their associated values can include a hash of the SSH server public key or the public key itself as described in Table I below:

TABLE I

| Value | Content Type |
|-------|--------------|
| 1 | SHA2 hash of the SSH server public key |
| 2 | 1024-bit PEM Key |
| 3 | 2048-bit PEM Key |
| 4 | 3072-bit PEM Key |
| 5 | 4096-bit PEM Key |

The client (MSO 102 uses this hash to validate the SSH server public key it receives from the SSH server/modem if the modem 106 is configured to communicate via an SSH port.

The two least significant octets denote the length of the length of the "SSH Key Payload" field in bytes. For SHA2hash this value is 32. For the SSH server public key itself, this value is the size of the public key in PEM, which is variable.

A 32-byte session key: The session key is used to encrypt the enabler/disabler which in turn enables/disables modem 106 interfaces such as the SSH interface, and to protect the password (if password protection is not available when the password is sent back to the device.

MAC Address: A six-byte MAC address of the modem 106: The modem's MAC address is used for generating an authenticated request to enable the interface and is part of the authenticated request.

Max Num Login: This number that represents the maximum number of times the authentication token 400 can be used to login to the modem 106.

The authentication token 400 may also include:

VN: A two-byte version number.

AID: A two-byte authentication ID, that contains an identifier of the authentication token. Modems may store multiple authentication tokens, for example, an MSO limited access token (AID=1) and an CPE provider token (AID=0).

Validity Period: The validity period is a 13-byte number indicating the time when the authentication token 400 begins to be valid in coordinated universal time (UTC), and a 13-byte number indicating the time that the authentication token 400 is scheduled to expire. The authentication token 400 may also comprise a 2-byte VP.

VP: The validity period may also be expressed as a time period from its first reception or use. This feature is useful when the time of day is unavailable. In one embodiment, the VP is a 2-byte number that contains the number of hours for the validity period. If modem 106 does not obtain the time of day, the modem 106 uses this value to determine when the authentication token should expire. The modem 106 updates non-volatile memory (NVM) with the remaining hours of the VP periodically (i.e. every hour) using a running clock. This validity period is not accurate if the modem 106 is powered down for a period of time, but can serve as a validity period estimate if the time of day is not available.

In the illustrated embodiment, the authentication token 400 comprises octets that are encrypted with the MSO public key to comprise readable characters that are base 64 encoded.

Encrypted AEK Token

Figure 4B:
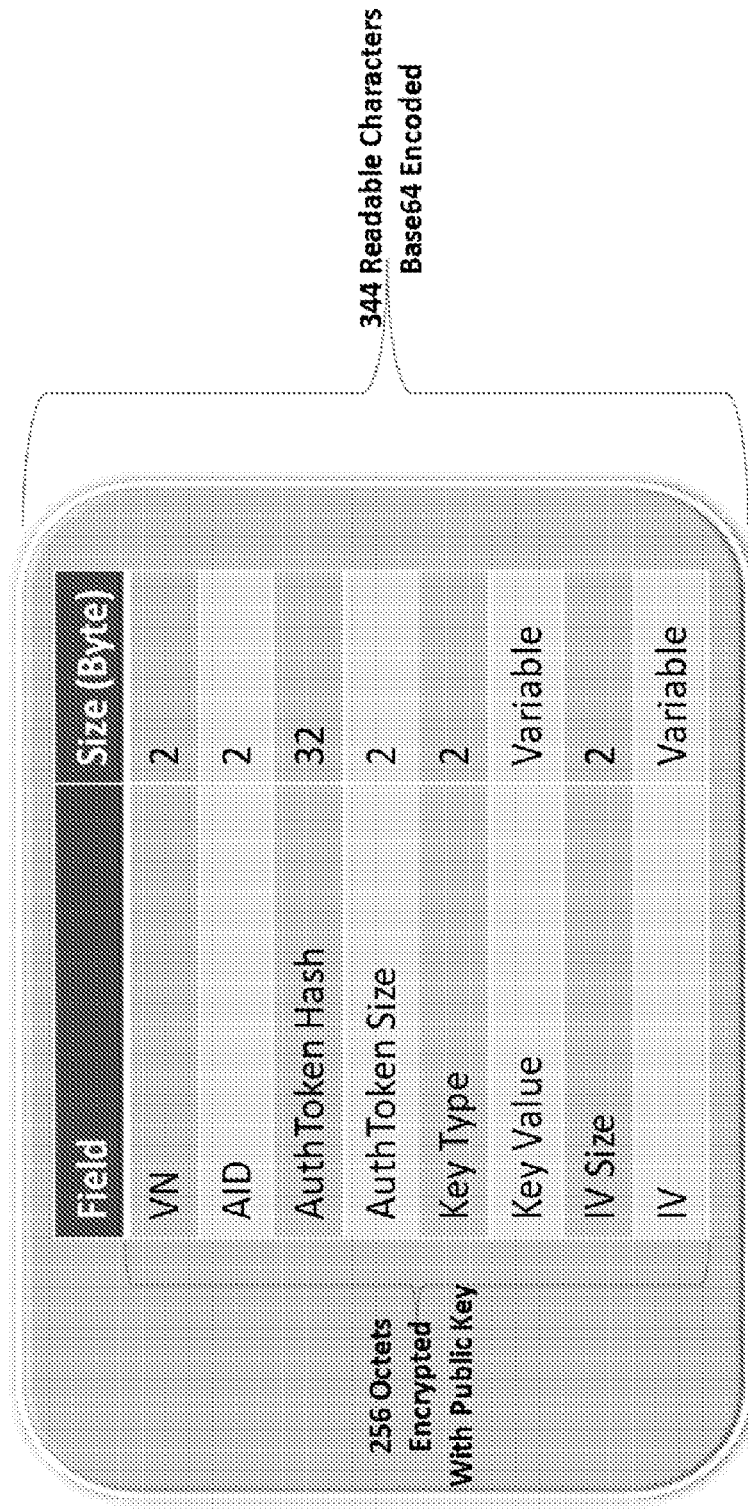

FIG. 4B is a diagram illustrating an exemplary embodiment of the encrypted AEK token 450. The encrypted AEK token includes the following fields:

VN (Version Number): This is a 2 octet value that contains the version number of the structure. It is nominally set to 1.

AID (Authentication Token ID): The AID is a 2 octet value that contains an identifier of the authentication token. The modem can contain multiple authentication tokens, and this AID must match the AID of the authentication token that is attached to the AIK token. The ID can take one of the following values: (1) CPE Provider Factory and Repair Authentication Token, (2) CPE Provider Tech Support Authentication token, and (3) MSO Authentication token.

Authentication Token Hash: This is a 32 octet Sha-256 hash over the decrypted authentication token. This hash is used as an extra measure to verify the authentication token that is attached to the AEK token. To verify the authentication token, the SHA-256 hash of the authentication token is calculated and compared to this hash. If the two hashes do not mash, the authentication token is not verified and not used.

Authentication Token Size: This is a 2 octet value that contains the length of the Base64 encoded authentication token in bytes that follows the AEK token in the token package.

Key Type: This is a 2 octet value that contains a key type identifier. Possible key types may be limited to a set of possible key types, represented as follows

TABLE II

| Value | Key Type |
|---|---|
| 1 | AES-128 in CBC mode (128 bits or 16 bytes) |
| 2 | AES-192 in CBC mode (196 bits or 24 bytes) |
| 3 | AES-256 in CBC mode (256 bits or 32 bytes) |

Key Value: This is a value of variable size (size is defined in the key type field), expressed in binary.

IV Size: This is a 2 octet value that defines the value of the IV in bytes. The default value is 0 which means the IV value is all 0 for the given key type.

IV: This is the IV value in binary, and is of the size defined in the IV size field above.

MSO—Based Modem Configuration and Login

Figure 5:
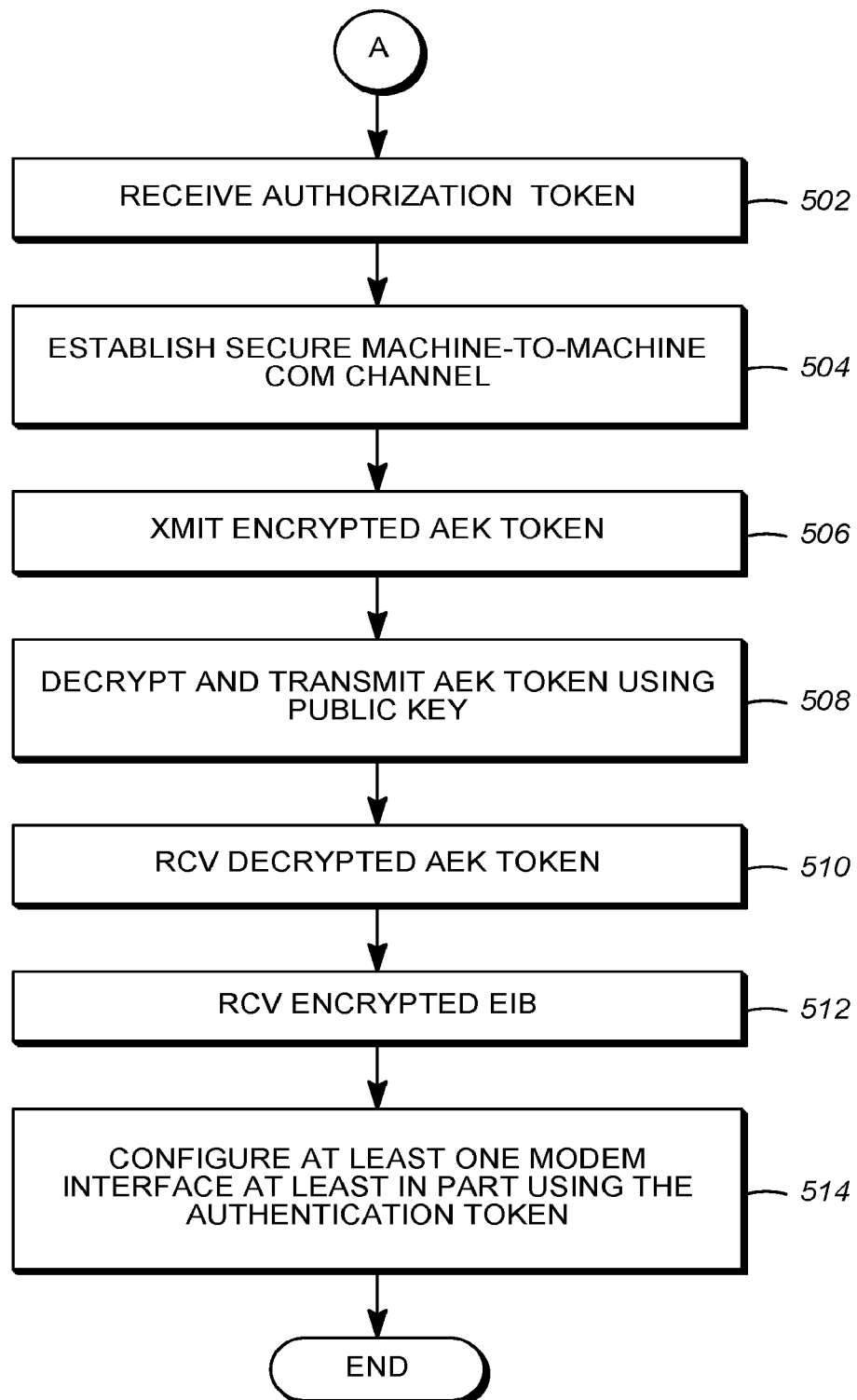
FIG. 5 is a diagram illustrating exemplary operations performed by the MSO to use the authentication token to configure CPE.

FIG. 5 is a diagram illustrating exemplary operations performed by the MSO 102 to use the authentication token to configure CPE 106. In the illustrated embodiment, this is accomplished with an operator client machine (OCM 306) (also alternatively referred to as SecureAce) operated by a member of the MSO's staff. In block 502, the MSO 102 receives the encrypted authentication token that was published by the modem 106. As described above, this can be accomplished by the MSO 102 fetching the encrypted authentication token via MIB or TR-069. This is illustrated as step (2) of FIG. 3.

If the communication channel between the OCM 306 and modem 106 is not secure, then a secure connection must be initiated by the OCM 306. Since the modem 106 must be authenticated in order to avoid potential attack vectors against the OCM 306, a one-way authentication on the transport layer security (TLS) where the modem 106 is authenticated is sufficient, as it will make such potential attack vectors commercially unviable. The OCM 306 is authenticated later when the modem 106 receives other messages from OCM 306 that are protected via the authentication token 400. To protect the communication channel for fetching the authentication token 400, the modem 106 acts a server and must provide its device certificate to the OCM 306 as part of the TLS handshake. The device certificate can be a CM BPI+ certificate or an analogous type of device certificate. The OCM 306 must have the Root certification authority (CA) certificate to perform certificate chain validation.

Optionally, if the MSO 102 needs to determine which PoE is enabled by asking the modem 106, the MSO 102 must obtain a copy of the enabled interface bitmap (EIB) which is the same as the encrypted Enabler from the modem 106. The modem 106 publishes the EIB through the same management interface as the interface used to publish the authentication token. The MSO decrypts the EIB using the session key obtained in the authentication token.

In block 504, the MSO 102 establishes a secure machine-to-machine communication channel with an authentication server 304. In one embodiment, this is accomplished via a hardware token 308 communicatively coupled to the OCM 306. The OCM 306 uses the hardware token 308 to authenticate itself to the authentication server 304 to establish a secure machine-to-machine communication channel.

After the secure machine-to-machine communications channel is established, the MSO 102 transmits the encrypted AEK token received from the modem 106 to the authentication server 304, as shown in block 506 and step (3) of FIG. 3. The authentication server 304 is configured to be able to decrypt the AEK token 450 (which was encrypted with the MSO public key) using the private key of the authentication server 304 as shown in block 508. After the AEK token 450 is decrypted, it is transmitted to the MSO 102 via the secure machine-to-machine communication channel, and is received by the MSO 102, as shown in block 510 and as shown in step (4) of FIG. 3. The decrypted AEK token includes the AEK (symmetric key generated by the modem). That AEK is used by the MSO 102 to decrypt the authentication token. The decrypted authentication token can be optionally verified by comparing the hash in the AEK token with the has over the decrypted authentication token.

Since the decrypted authentication token includes the one or more passwords needed to login to the modem, the MSO 102 has the information necessary to login to the modem 106.

In some instances, it may be beneficial for the MSO 102 to determine which of the modem 106 interfaces are currently enabled. This can be accomplished by the MSO 102 receiving a copy of the configuration data that was published in the operations described above, as shown in block 512. In one embodiment of the configuration data comprises a bitmap known as an enabled interface bitmap (EIB) (also hereinafter referred to as the encrypted enabler), which is described further below. Since the EIB was encrypted according to the session key (which is transmitted to the MSO 102 in the now decrypted authentication token), the MSO 102 decrypts the EIB using the session key, and determines the configuration of the modem 106 from the values of the EIB.

Finally, in block 514, the MSO 102 configures at least one of the modem interfaces at least in part using the authentication token. In one embodiment, this is accomplished by the using the OCM 306 to set values in the EIB to enable or disable the appropriate interfaces. In one embodiment, the OCM 306 enables/disables the interfaces by setting appropriate values into the EIB according to user input or other information. Such interfaces can include the desired PoEs such as SSH interfaces. The MSO 102 then generates an enabler token 700 by encrypting the MAC address (obtained from the decrypted authentication token) and the EIB with the at least a portion (e.g. the lower 16 bytes) of the session key (also obtained from the decrypted authentication token), and transmits the enabler token 700 to the modem 106 as shown in step (6) of FIG. 3, and block 514.

Figure 6:
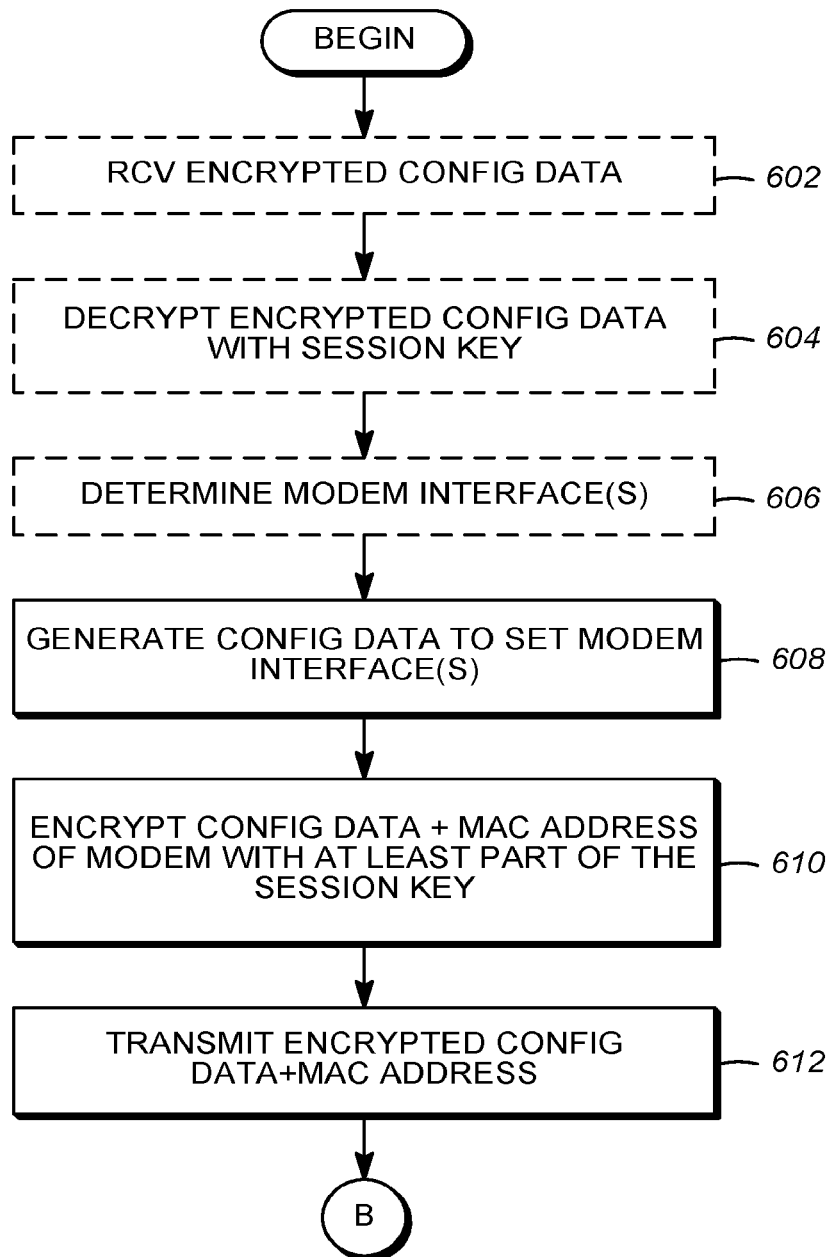
FIG. 6 is a diagram depicting exemplary operations performed to configure the modem interface using the authentication token.

FIG. 6 is a diagram depicting exemplary operations performed to configure the modem interface using the authentication token. Blocks 602-606 are optionally performed in the situation where the operator at the MSO 102 wants to determine which modem 106 interfaces are currently enabled. In block 602, the MSO 102 (e.g. the OCM 306) receives the encrypted enabler/disabler token having the encrypted configuration data (EIB) that was published by the modem 106 in block 216 of FIG. 2. In block 604, the encrypted configuration data is decrypted using the session key of the authentication token. In block 606, the EIB is used to determine the currently enabled and disabled modem 106 interfaces.

Figure 7:
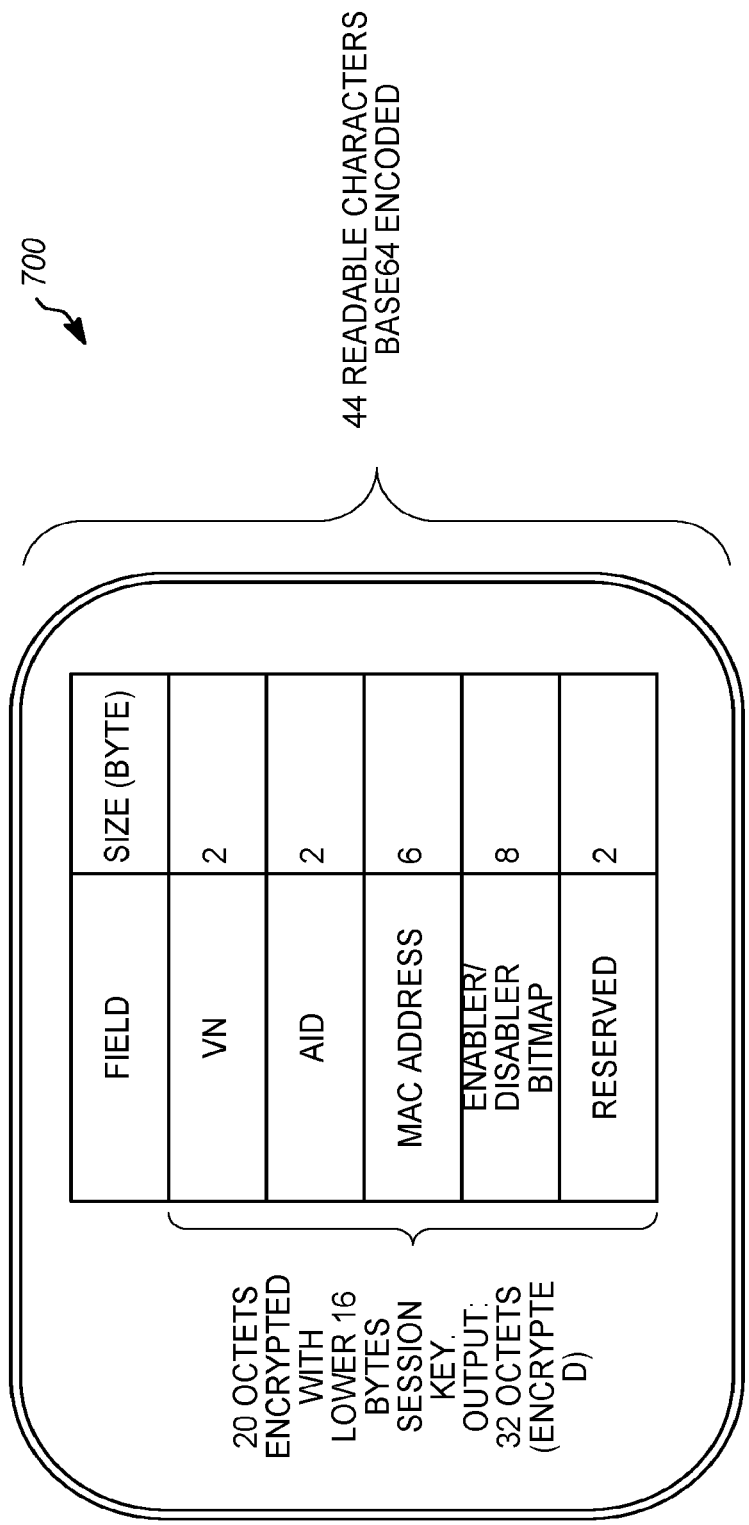
FIG. 7 is a diagram of one embodiment of the encrypted enabler/disabler token.

FIG. 7 is a diagram of one embodiment of the encrypted enabler/disabler token 700. In one embodiment, the enabler/disabler token 700 comprises fields for:

Version Number (VN): This is a two-byte value that contains the version number of the structure. Nominally, it is set to one.

Authentication Token ID (AID): This is a two-byte value that contains the ID of the related authentication token. This authentication token is the same (and has the same ID) as the authentication token described above.

MAC Address: A six-byte MAC address of the modem 106: The modem's MAC address is used for generating an authenticated request to enable the interface and is part of the authenticated request.

Enabler/Disabler Bitmap: This is a 64-bit bitmap for enabling or disabling interfaces on the modem. There are 4 access levels and each access level has a password from the token and 16 bits from the enabler bitmap. The password and bitmap together define the access level for each interface. Bit0 is least significant bit and Bit 63 is most significant bit. Value 1 enables the interface and value 0 disables the interface.

Figure 8:
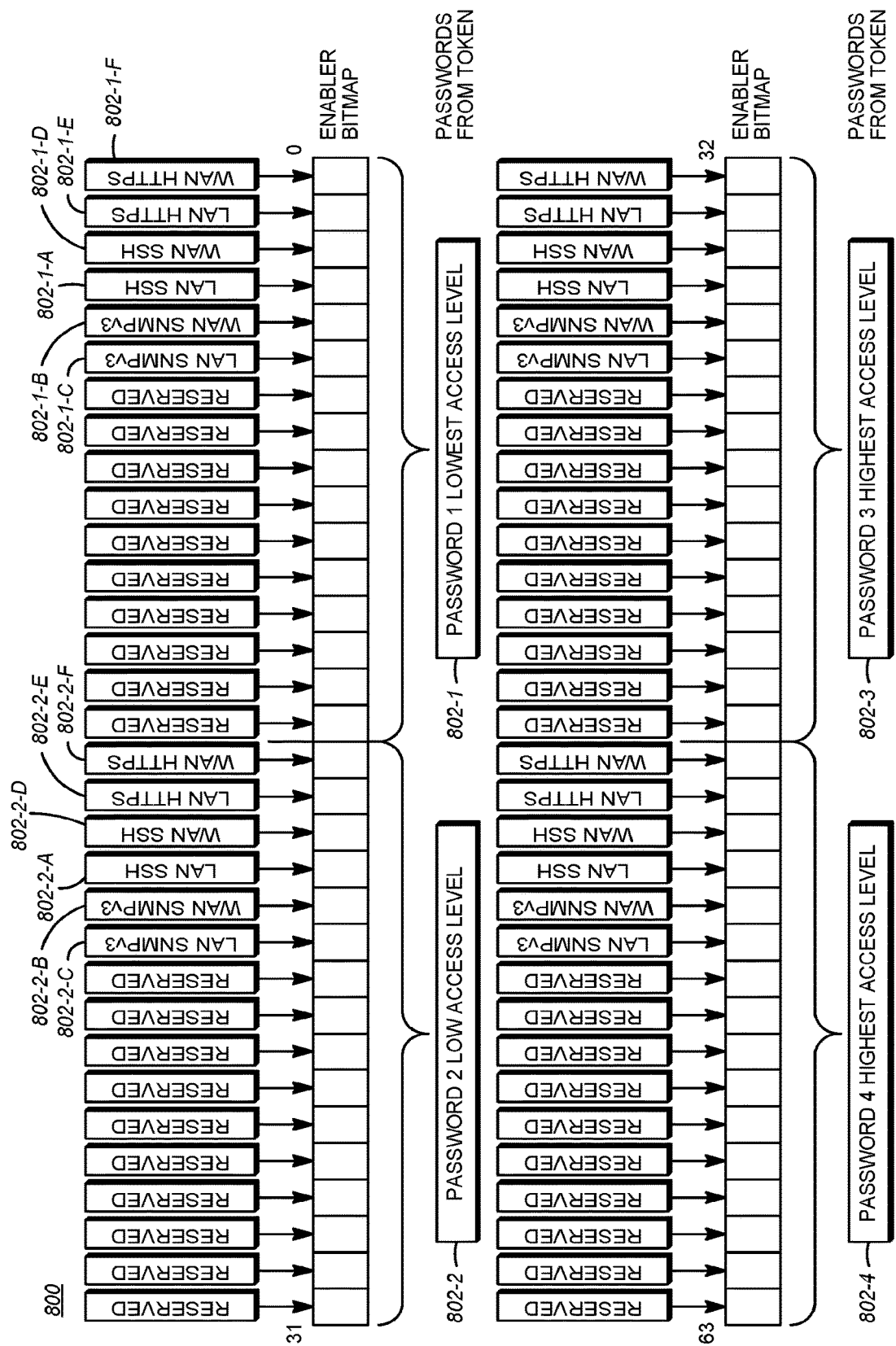
FIG. 8 is a diagram depicting an exemplary embodiment of the enabler/disabler bitmap.

FIG. 8 is a diagram depicting an exemplary embodiment of the enabler/disabler bitmap or EIB 800. The exemplary authentication token 400 illustrated in FIG. 4 has four passwords. Each of the passwords may provide a different level of access to the modem 106. In the example presented in FIG. 8, password 1 802-1 provides the lowest access level (level 1), password 2 802-2 provides a low access level (level 2), password 3 802-3 provides a high access level (level 3), and password 4 802-4 provides the highest access level (level 4). In one embodiment, level 1 access permits reading data from the modem 106, access level 2 allows reading data from and writing data to the modem 109, level 3 allows reading data from and writing data to secure memory, and level 4 allows blowing fusible links or other functions that alter hardware. Each of the passwords enable the associated portion of the EIB 800 as illustrated in FIG. 8. For example, password 1 enables the first 16 bytes of the EIB 800, password 2 enables the next 16 bytes of the EIB 800, password 3 enables the next 16 bites of the EIB 800, and password 4 enables the remaining bytes of the EIB 800.

The EIB 800 defines which modem interfaces are enabled for each access level. An interface with a specific access level is enabled by setting the associated value of the bitmap to 1, and disabled by setting the associated value to zero. For example, the EIB portion associated with password 1 has a value for a LAN SNMPv3 interface 802-1-C, a WAN SNMPv3 interface 802-1-B, a LAN SSH interface 802-1-A, a WAN SSH interface 802-1-D, a LAN HTTPS interface 802-1-E, and a WAN HTTPS interface 802-1-F. The value associated with the interface indicates whether the interface is enabled or disabled, and setting the value selects whether the interface is enabled or disabled. In one embodiment, setting the associated value to a "1" enables the associated interface. For example, if the user wants to disable all interfaces except the LAN SNMPv3 interface when at the lowest access level (password 1), the values associated with the LAN SNMPv3 interface 802-1-C is set to "1" and the remaining values associated with the WAN SNMPv3 interface 802-1-B, a LAN SSH interface 802-1-A, a WAN SSH interface 802-1-D, a LAN HTTPS interface 802-1-E, and a WAN HTTPS interface 802-1-F are all set to zero. Similarly, if the user may permit the LAN SNMPv3 interface 802-1-C, the WAN SNMPv3 interface 802-1-B, the LAN SSH interface 802-1-A and the WAN SSH interface 802-1-D to be enabled for level 2 access (and disabling the LAN HTTPS 802-1-E and WAN HTTPS interface 802-1-F) by setting the associated bits to "1" and zero, respectively.

Returning to FIG. 6, the current modem interfaces are determined (as shown in block 606) using the EIB as described above. Using the OCM 306, the user may change the values associated with selected modem 106 interfaces to enable or disable the interface, as shown in block 608. Further, permission to use those interfaces is controlled by associating a password with the EIB portions, so only those users having access to a particular level (e.g. by being in possession of the password for that level) will be able to use those interfaces. In block 610 the EIB and MAC address of the modem 106 is encrypted with at least part of the session key. In an illustrative embodiment, the lower 16 bytes of the session key are used to encrypt the bitmap and MAC address. In block 612, the encrypted configuration data and MAC address is encapsulated into an encrypted enabler/disabler token 700, and transmitted to the modem 106. This can be accomplished, for example, by setting its MIB (or TR-069).

Hence, the OCM 306 sets values in a 32-bit bitmap to enable or disable the modem interfaces. The OCM then encrypts the MAC address (obtained from the authentication token) and bitmap with the lower 16 bytes of the session key (also obtained from the authentication token), and sends the encrypted information to the modem 106.

Figure 9:
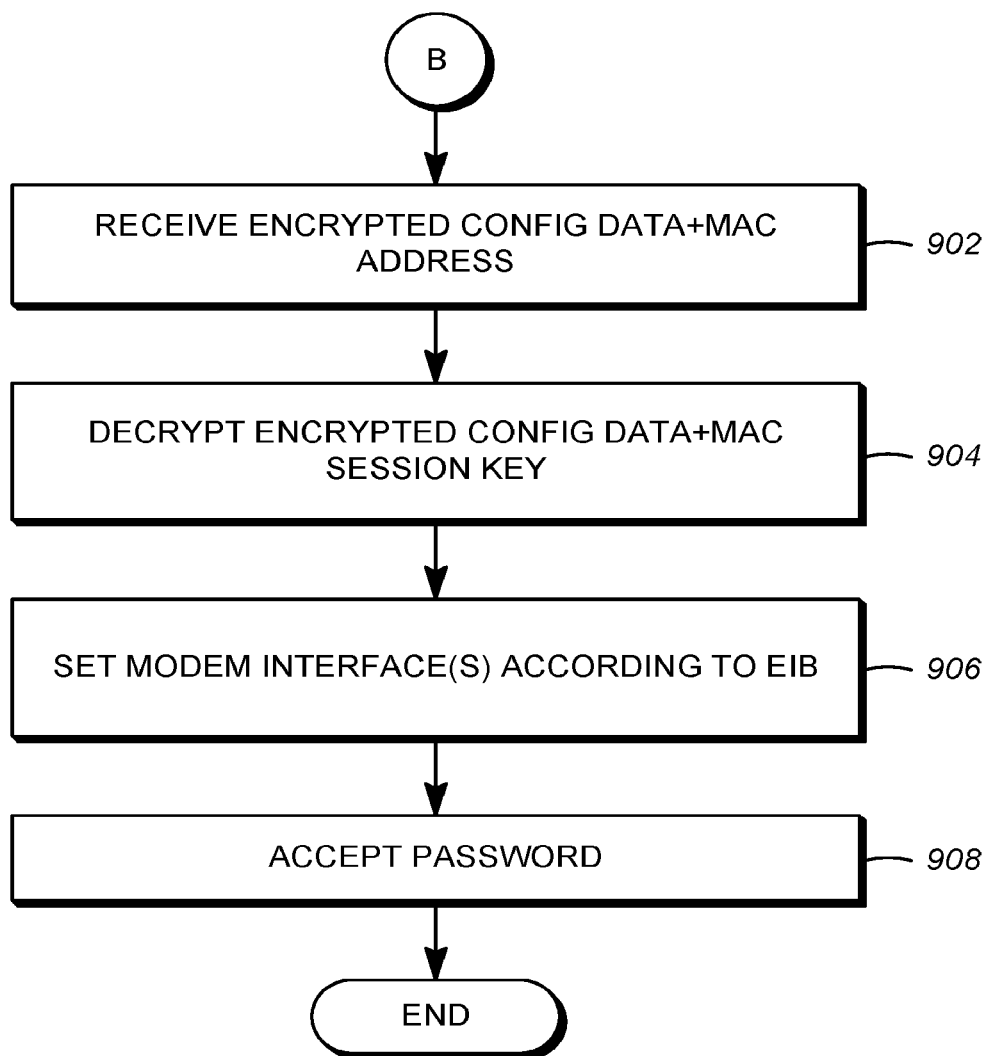
FIG. 9 is a diagram depicting further exemplary operations performed to configure the modem.

FIG. 9 is a diagram depicting further exemplary operations performed to configure the modem 106. As shown in block 902, the modem 106 receives the encrypted enabler/disabler token 700 having the configuration data (EIB) and MAC address. As shown in block 904, the modem 106 uses the session key to decrypt the encrypted enabler/disabler token to recover the configuration data and MAC address and verifies the data. In embodiments wherein the configuration data and MAC address are encrypted with the lower 16 bytes of the session key, only those lower 16 bytes are used to decrypt the encrypted enabler/disabler token. The modem 106 sets (enables or disables) the indicated interfaces according to the EIB, as shown in block 906. The enabler/disabler settings are then stored in the secure storage 108 of the modem 106. Finally, the OCM 306 may obtain the password from the authentication token to login to the modem using one of the enabled interfaces, as shown in block 908.

CPE Provider—Based Remote Modem Configuration and Login

In the previous embodiment, the MSO 102 was capable of restarting and resetting the modem 106. However, there are instances in which the modem 106 may be unresponsive and the CPE provider 114 will be called upon to configure the modem 106. In this instance, the CPE Provider Tech Support Authentication token is of use. The authentication server 304 public key and other parameters are hardcoded in the software image of the modem, rather than using the configuration file to pass these parameters to the modem.

Figure 10:
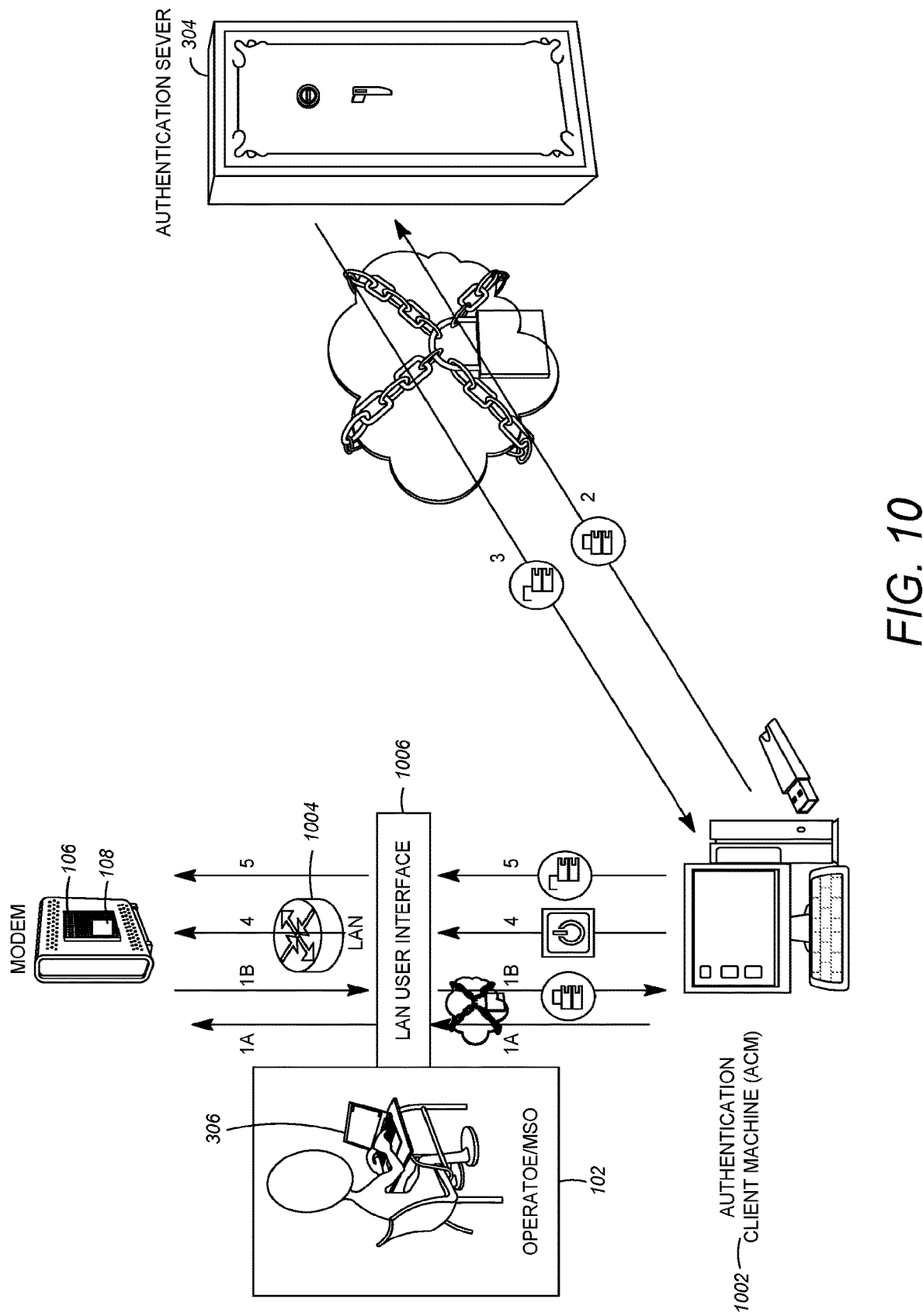
FIG. 10 is a diagram illustrating another embodiment of how the modem may be remotely configured.

FIG. 10 is a diagram illustrating another embodiment of how the modem may be remotely configured. In this embodiment, an authentication client machine (ACM) of the CPE provider 114 performs many of the steps performed by the OCM 306 of the MSO 102 in the above embodiments.

In step 1, the operator of the ACM 1002 or repair facility receives the encrypted authentication token from the modem 106 through a user interface 1006 with the LAN 1004.

Specifically, the modem 106 comprises a processor that operates by executing software instructions represented in a software image installed on the modem. Embedded in this image are an ACM public key, an authentication token validity period, and a maximum number of login values. When the modem 106 is booted up, it automatically generates an ACM authentication token with the validity period and maximum number of login values and encrypts it with the ACM public key, as described below. If the modem 106 resets and restarts, the modem 106 disables the temporary LAN user interface and the ACM authentication token it just generated (as they are not required). The MSO 102 can then configure the modem 106 as described above.

However, if the modem 106 fails a reset and restart operation (as indicated, for example, by not resetting and restarting within a time period such as 15 minutes), the modem 106 enables its LAN user interface 1006 by opening up a dedicated temporary port. The modem 106 then uses that temporary LAN user interface 1006 (and only the LAN user interface 1006) to send the ACM authentication token, accept passwords, and to receive the enabler/disabler token 700. The dedicated temporary port remains open only so long as it is needed, and once the modem has reset and restarted, the dedicated temporary port is closed.

Figure 4C:
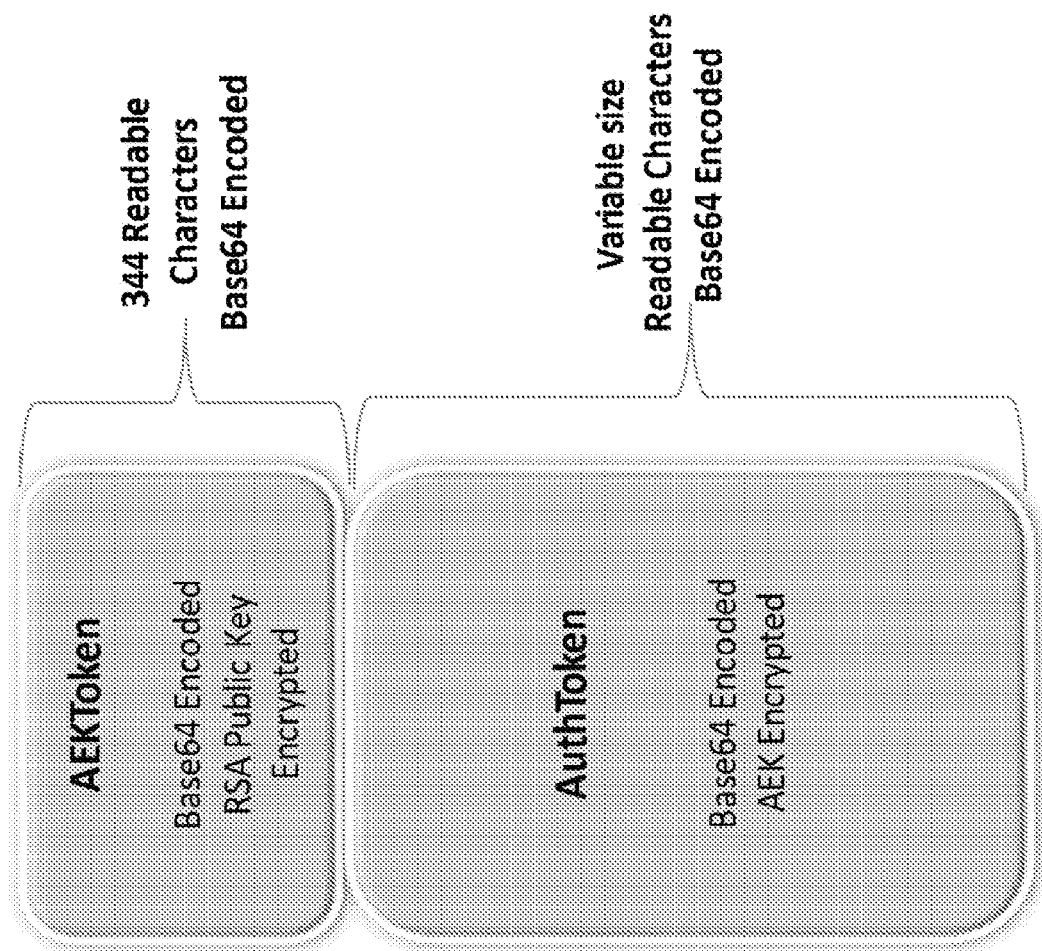

As before, if the current authentication token has expired, the modem 106 generates a new set of passwords, a 32-byte session key, an SSH server key hash. The modem 106 then tags these values with the CP, the remaining number of logins and the MAC address of the modem 106. This data is encrypted with the random symmetric key (AEK), and the AEK is then encrypted with the public key of the ACM 1002 (already embedded in the software image of the modem 106) and the AEK token is generated. The authentication token is then appended with the AEK token to create an authentication token package, which is published as the ACM authentication token package on the temporary dedicated port of the modem 106. FIG. 4C is a diagram of one embodiment of the authentication token package 475.

The generated authentication token 400 remains valid for the remaining validity period (VP). The authentication token will not get renewed unless the VP has ended and the modem 106 remains unable to reset and restart.

Since data regarding the time of day is not typically available if the modem 106 fails a reset and restart operation, the values of the authentication token for the validity start and validity end are set to zero. The VP is then set to a default number of hours, and is used to determine when to renew the authentication token package for the ACM 1002.

Next a technician or operator of the MSO 102 sends the encrypted authentication token package received from the modem 106 to the ACM 1002. This may be accomplished via email, for example, in response to a request from the operator of the ACM 1002.

Optionally, if the operator of the OCM 306 desires to determine which interface is currently enabled by querying the modem 106, the OCM 306 can obtain a copy of the EIB 800 of the encrypted enabler token 700. The control modem 106 publishes the encrypted enabler token 700 through the same management interface that is used to publish the authentication token. Once the encrypted enabler/disabler token 700 is fetched by the OCM 306, the OCM 306 can use the session key in the authentication token to decrypt the encrypted enabler/disabler token, retrieve the EIB, and determine from the EIB which interfaces are enabled.

Returning to FIG. 10, in step 2, the ACM 1002 transmits the encrypted AEK token to the authentication server 304. As was true with the MSO-Based Remote Modem Configuration and Login procedures discussed above, this is performed over a secure link, with the link preferably secured via a hardware token as illustrated. The hardware token authenticates itself to the authentication server 304 and establishes a secure machine-to-machine communication channel. The authentication server 304 uses a private key that corresponds to the public key of the ACM 1002 to decrypt the AEK token.

In step 3, the authentication server 304 returns the decrypted AEK token to the ACM 1002 via the secure link.

The decrypted AEK token includes the AEK (symmetric key generated by the modem). That AEK is used by the ACM 1002 to decrypt the authentication token. The decrypted authentication token can be optionally verified by comparing the hash in the AEK token with the has over the decrypted authentication token.

In step 4, the ACM 1002 securely enables or disables the modem 106 interfaces as desired. This is accomplished by the ACM 1002 setting a 32-bit bitmap (EIB 800) to enable/disable the desired interfaces (i.e. the LAN SSH interface enabled by, for example, bits 802-1-A or 802-2A of FIG. 8), and transmitting the EIB to the modem 106. If higher access levels are required, the LAN SSH interfaces associated with higher access levels (and passwords) can be enabled. The ACM 1002 then encrypts the MAC address of the modem 106 (obtained from the decrypted authentication token 400) and the EIB 800 with the lower 16 bytes of the session key (also obtained from the decrypted authentication token 400), and encapsulates the result as the encrypted enabler/disable token 700. The ACM 1002 then sends the encrypted enabler/disabler token 700 to the modem 106 using the enabled LAN User Interface 1006. The modem 106 receives the encrypted enabler/disabler token, uses the lower 16 bytes of the session key to decrypt the enabler/disabler token, verifies the data and sets the modem 106 interfaces according to the EIB 800. The enabler/disabler settings of the EIB 800 are stored in the secure storage 108 of the modem 106.

In step 5, the ACM 1002 gets the password from the decrypted authorization token received from the authentication server 304, and sends it to the LAN User Interface 1006. The operator at the MSO 102 can then use the enabled SSH LAN interface to provide the password for the appropriate level of access, and logs in to the modem 106.

Random Number Generator (RNG)

The password and keys are generated independently by the modem 106. Regardless of the security infrastructure imposed to protect and secure these passwords and keys, a cryptographically weak password can be attacked directly by bypassing the entire security infrastructure. Accordingly, passwords and keys must be generated using a cryptographically strong RNG.

Disabling SSH Ports

An SSH port, interface, or other PoE is said to be disabled if it has been closed. It is possible that the authentication token validity period may expire during an active SSH session. In such circumstances, the modem 106 will not close the port and disable the SSH port until the user logs out of the modem 106. This creates an undesirable situation where a port remains open after the authentication token has expired. Accordingly, it is advantageous to have a means by which the SSH (or other) port may be disabled.

Manual: One technique for disabling the SSH port is to generate an enabler/disabler token 700 with an EIB 800 with the appropriate bits set to zero, and transmit that enabler/disabler token 700 to the modem 106.

Automatic: Another technique for disabling the SSH port is to configure the modem 106 to automatically disable the port whenever the authentication token validity period expires. This obviates the situation described above. Also, the SSH port may be closed at every SSH logout.

Hybrid (Manual/Automatic): Still another technique for disabling the SSH port is to allow the port to remain open and enabled until one of the following events occurs: (1) the modem receives an enabler/disabler token 700 with an EIB 800 with the appropriate bits set to zero, or the authentication token 400 validity period has expired.

SSH Server Public Key Verification

As described above, use of the modem's SSH interfaces (LAN or WAN) requires distributing the modem's SSH public key (or "server" public key, as the modem 106 is acting in the capacity of the "server" in this instance) to the OCM 306 or ACM 1002 (or "client" as the OCM 306 or ACM 1002 is acting like a "client"). Merely accepting the modem's SSH public key on trust and without verification represents a security issue, as any entity may claim to be the modem. Accordingly, it is desirable to provide a means for the OCM 306 or ACM 1002 to verify the modem's SSH public key before accepting and storing it. A description of the SSH architecture may be found in "The Secure Shell (SSH) Protocol Architecture," RFC 4251 by T. Ylonen, Network Working Group, SSH Communications Security Corp., January 2006, which is hereby incorporated by reference herein.

In one embodiment, this is accomplished by the modem 106 inserting a hash of the modem's SSH public key into the authentication token 400 each time the token 400 is generated. When the client (OCM 306 or ACM 1002) receives the decrypted authentication token 400 from the authentication server 304, it extracts the hash of the modem's SSH public key. The SSH protocol includes a handshake between the server and client, at which time the client receives the modem's SSH public key. The client then regenerates the hash of the modem's SSH public key it received from the modem 106, and compares that regenerated hash with the hash received in the authentication token 400. If the two hashes have the same value, the client (OCM 306 or ACM 1002) may then trust the modem's SSH public key (received in the handshake) and store it for later use, preferably in secure storage of the OCM 306 or ACM 1002). The public key is then used according to the SSH protocol. Advantageously, this embodiment requires a small static space in the authentication token 400 regardless of the size of the public key (since the hash of the SSH server public key can be much smaller in size than the SSH server public key itself), and can therefore more easily support large populations of modems 106. However, this embodiment may require changes to OTS (off the shelf) SSH client processor instructions.

In a second embodiment, this is accomplished by the modem 106 inserting the SSH server public key into the authentication token 400 each time the token 400 is generated. If the authentication token 400 contains the server public key, the client (OCM 306 or ACM 1002) may update the SSH client database of SSH server public keys using the newly received SSH server public key. This can be accomplished, for example, by updating a previous key in the SSH server public key database with the newly received SSH public key. Advantageously, this embodiment can be implemented without modification to OTS SSH client processor instructions. However, this embodiment is more demanding in terms of memory, as a number of large SSH server public keys may require storage for systems having large modem 106 populations.

Type-length-value (TLV) parameters in the configuration file 302 of the modem 106 can be used to signal whether the modem 106 is to insert the SSH server public key or a hash of the SSH server public key.

SNMPv3 Key Management

Authentication token 400 usage can also be extended to support key management in an SNMPv3 protocol (e.g. using one of the SNMPv3 compliant modem 106 interfaces illustrated in FIG. 8). SNMP (Simple Network Management Protocol) is an Internet standard protocol for collecting and organizing information about managed devices on IP networks and for modifying that information to change device behavior. Devices that typically support SNMP include cable modems, routers, switches, servers, workstations, printers, and more. Earlier versions of SNMP (versions one and two) not provide for cryptographic security in the configuration and management of remote devices. Instead, authentication in SNMP versions one and 2 amounts to nothing more than a password (community string) sent in clear text between a manager and agent.

However, version three (SNMPv3) implements a user-based security model that permits communication without authentication and privacy (encryption) (NoAuthNoPriv), communication with authentication and without privacy (AuthNoPriv), and communication with authentication and privacy (AuthPriv). These features require the use of one or more authentication keys and a privacy keys. The difficulty is in how the authentication keys and privacy keys can be distributed securely and in a way which permits their authentication before use.

SNMPv3 uses key localization, which attempts to provide unique keys to all authoritative SNMP engines in the network. Key localization uses a single password to derive keys for the entire network. However, since the same password is used to derive keys for the entire network, the entire network is compromised if that single password is compromised.

In the embodiments described herein, the authorization token 400 can be used to provide a unique password to each authoritative SNMP engine (e.g. the OCM 306 or ACM 1002 and modem 106), thus obviating the foregoing problem. This can be accomplished, for example, by deriving both the authentication key and privacy key of SNMPv3 from one or more of the passwords in the authentication token 400. Using the techniques described above, different and unique authentication keys and private key are generated by each modem 106 in the network. Accordingly, the compromise of a password associated with one particular modem does not compromise the passwords of the remaining modems of the network. Since the authentication token 400 is renewed periodically and under the specific circumstances outlined above, the security of the authentication key and privacy key is also stronger than with a standard SNMPv3 implementation, as the authentication and privacy keys are of less value due to their temporary effectiveness. When the authentication token 400 is renewed, the associated passwords (unique to each engine or modem 106) are randomly generated and are also renewed, and the newly generated keys have no dependency on the previous keys.

Derivation of the new authentication key and privacy keys can be performed by a variety of cryptographic operations. As described above, each modem 106 includes the ability to generate a random number (whether by hardware or software random number generator), and the authentication key and privacy key may be generated as a combination of plurality of cryptographic operations, for example, by computing hashes and other cryptographic operations. Use of the SNMPv3 protocol is further described in "User-Based Security Module (USM) for version 3 of the Simple Network Management Protocol (SNMPv3)," RFC 3414, by U. Blumenthal and B Wijnen, Network Working Group, December 2002, which is hereby incorporated by reference herein.

Secure Short Lived Downloadable Tools

With regard to deployed CPEs, customers such as MSOs may require removing all debugging tools from CPE firmware that would allow remote access to a deployed CPE in order to protect products in the field from unauthorized access. For example, it may be required to remove SSH from the device, which would result in permanently losing access to the device in field. The problem arises when there is a field issue and the authentication client support team or the customer (MSO) itself would need to have a remote access to the device to debug the issue in the fielded device but the device does not allow any remote access.

Further, with regard to CPEs in a factory production line of the CPE provider 114, it may happen that after the customer image is installed on the device on the production line at the factory, access to the device may be required to perform some final validation testing. If the testing tools and login tools are compiled out of the customer image, then the factory will not be able to perform the final validation as part of its quality control.

The system described below provides a solution to the foregoing problems. With regard to deployed (e.g. fielded) CPEs, the debugging tools are uploaded to fielded CPEs securely and get enabled only for a configurable limited time. Such tools must be downloadable over any open network and the CPE should verify the tool before it will accept it. In this case, the tool/tools are short-lived, can be used only during a limited validity period, and are removed from the CPE after it the validity period expires.

With regard to CPEs on the factory production line, the login tool (e.g. SSH) and the required CLI can be uploaded to the RAM and get executed while the unit is running on the customer load but not locked down. Once the testing is performed, the unit is locked down and the uploaded tools are removed permanently.

This solution takes advantage of the authentication token 400 and session key inside the authorization token to sign the tool package. Once the ACM 1002 receives the authentication token 400 from the CPE and decrypts it via the authentication server 304, it uses the session key to sign the tool package. The signed tool package is then placed on a load server. The operator initiates a download command (for example, via SNMP, TR069), which can contain the package name and the load server IP address. The CPE downloads the package, verifies the signature using the session key, unpacks the package, and executes it from RAM. The tool is removed from RAM on the next reboot of the CPE or by issuing a delete command either from the shell or the management interface. The signed package is valid only during the validity period specified in the authentication token 400. Once a new authentication token 400 is generated, the CPE rejects any package that was signed with an older authentication token 400 session key.

Figure 11:
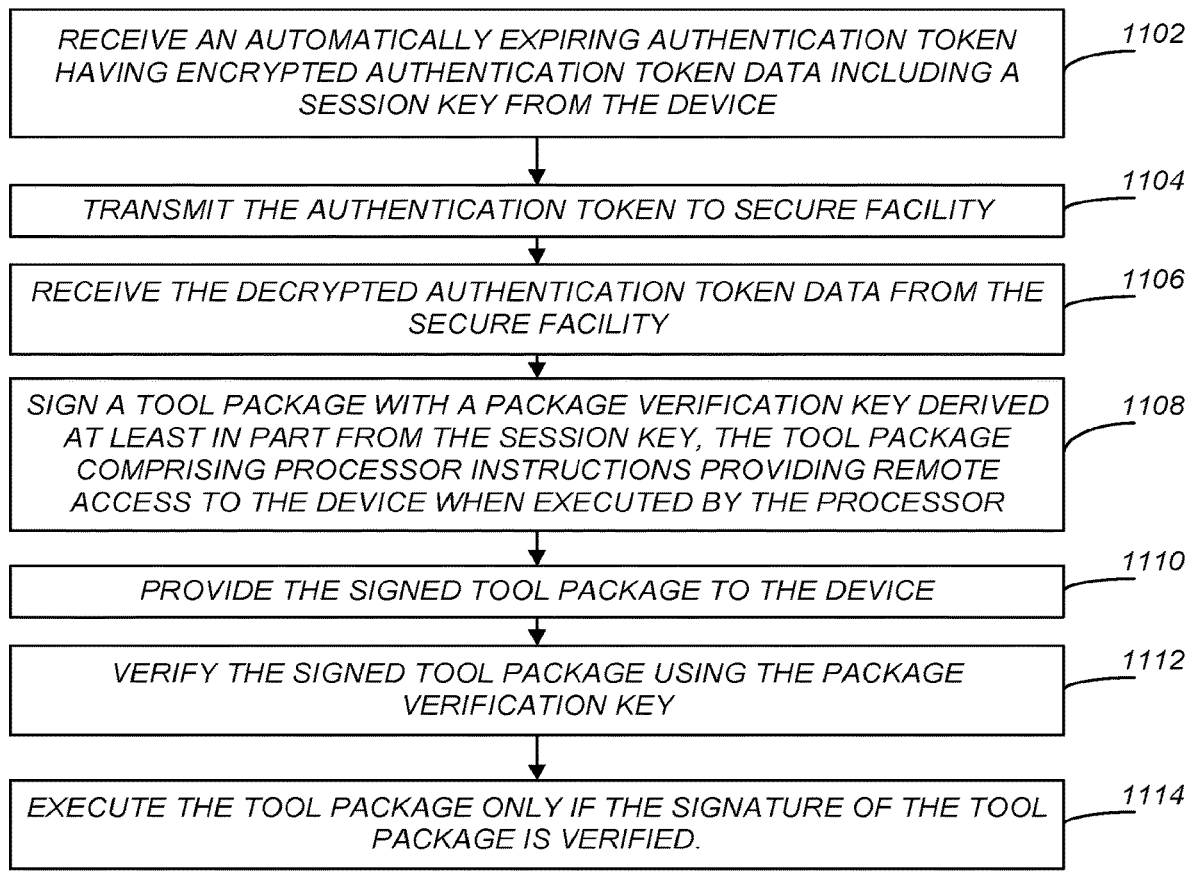
FIG. 11 is a diagram illustrating exemplary steps that can be used to provide remote access to a device.

FIG. 11 is a diagram illustrating exemplary steps that can be used to provide remote access to a device 106. The device 106 generates an authorization token. The authentication token 400 automatically expires and has encrypted authorization token data including a session key. The device 106 transmits the authentication token 400 to the MSO 102 or ACM 1002, where it is received, as shown in block 1102.

Figure 12:
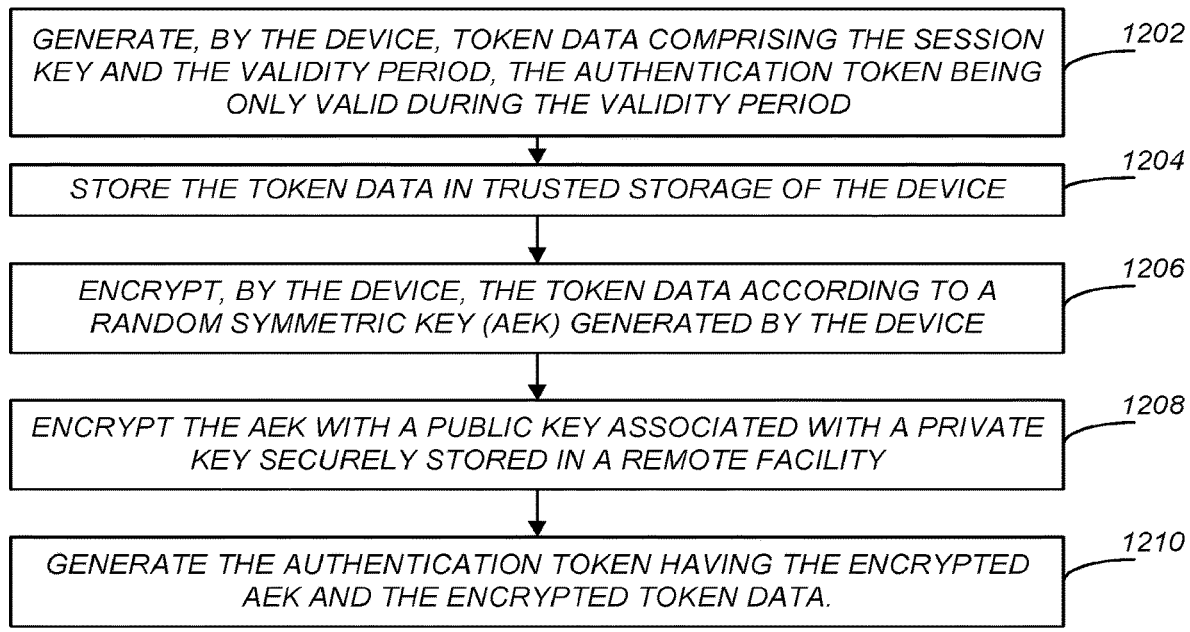
FIG. 12 is a diagram illustrating exemplary operations that can be performed to generate the authorization token.

FIG. 12 is a diagram illustrating exemplary operations that can be performed to generate the authorization token. In block 1202, the device 106 generates token data comprising the session key and validation period. The authentication token 400 is only valid during the validity period. In block 1204, the authentication token 400 is stored in trusted storage of the device 106. In block 1206, the device encrypts the token data generated according to a random symmetric key (AEK) generated by the device. In block 1208 AEK is encrypted with a public key associated with a private key securely stored in remote secure facility such as the authentication server 304. Then, as shown in block 1210, the authentication token 400 is generated. The authentication token 400 includes the encrypted AEK and the encrypted token data.

Referring back to FIG. 11, in block 1104, the received authentication token 400 is transmitted to a secure facility such as the authentication server 304. The secure facility 304 decrypts the encrypted authentication token data to generate the authentication token data, and transmits the decrypted authentication token data back to the entity from which it received the encrypted authentication token (e.g. the MSO 102 or ACM 1002). In block 1106, the decrypted authentication token data is received from the secure facility. In block 1108, a tool package 1602 comprising processor instructions is signed with a package verification key that is derived at least in part from the session key. The processor instructions, when executed by a processor in the client device 106 provide remote access to the device 106.

Figure 13:
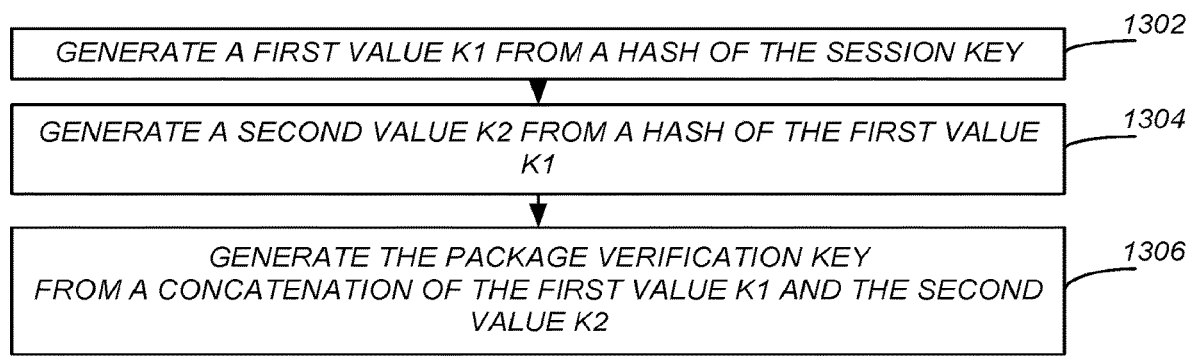
FIG. 13 is a diagram illustrating one embodiment of how the package derivation key may be derived.

FIG. 13 is a diagram illustrating one embodiment of how the package derivation key may be derived. In block 1302, a first value K1 is derived from a hash of the session key. In block 1304, a manifest is generated having the hash of the tool package. In block 1306, the package verification key is generated from a concatenation of the first value K1 and the second value K2.

Figure 14:
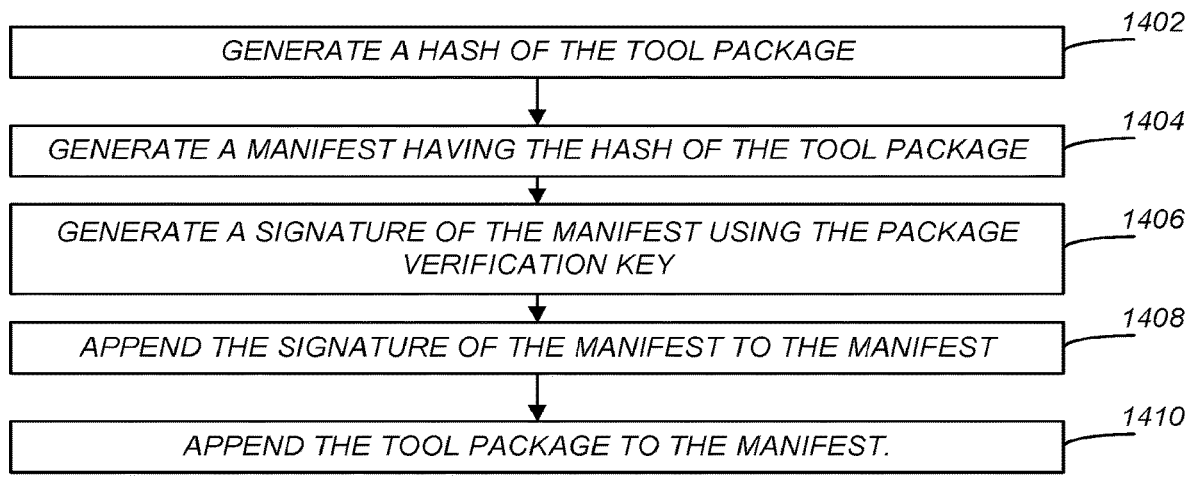
FIG. 14 is a diagram illustrating one embodiment of operations used to sign the tool package with the package verification key.

FIG. 14 is a diagram illustrating one embodiment of operations used to sign the tool package 1602 with the package verification key. In block 1402, a hash of the tool package is generated. In block 1404, a manifest having the hash of the tool package as well as other optional information is generated. In block 1406, a signature of the manifest is generated using the package verification key. In block 1408, the signature of the manifest is appended to the manifest to create a signed manifest.

FIG. 15 is a diagram illustrating one embodiment of the signed manifest 1500. The signed manifest 1500 includes signed portion 1502 and an unsigned portion 1504. The signed portion 1502 includes a Magic_Text field, which identifies the beginning of the manifest 1500, a Manifest_Size field, which describes the total size of the manifest, including the appended signature, the Manifest_Version field, which defines the version number of the manifest, the Package_Hash field, which is the hash of the package, the Package_Size field, which indicates the package size, and a Signed_Reserved field, which is reserved for future use. All of the foregoing fields are signed using the package verification key, and the signature is appended to the manifest to create the signed manifest 1500.

Figure 16:
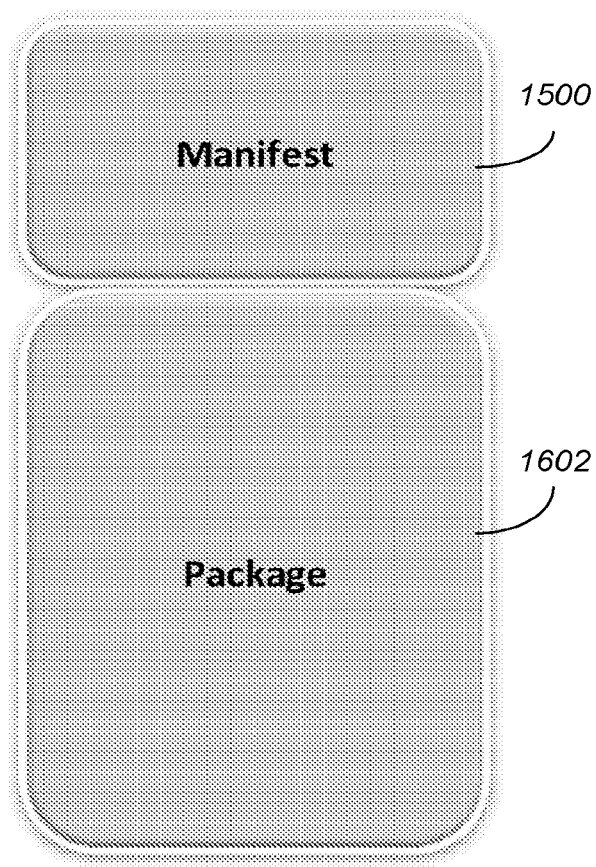
FIG. 16 is a diagram of a signed tool package.

Returning to FIG. 13, in block 1410, the tool package 1602 is appended to the signed manifest 1500, resulting in the signed tool package 1600 shown in FIG. 16.

Finally, returning to FIG. 11, in block 1110, the signed tool package 1600 is provided to the device 106. In block 1112, the signed tool package is verified by the device using the package verification key.

This is accomplished by the device 106 parsing the signed tool package 1600 to obtain the signed manifest, and the signed manifest is parsed to obtain the manifest and the manifest signature. The device 106 then computes its own version of the package verification key, as described in FIG. 13, and uses the package verification key to generate a signature for the received manifest. If the signature generated by the device 106 matches the signature generated by the MSO 102 or ACM 1002 and appended to the manifest, the signed tool package 1600 is verified.

If the signed tool package 1600 cannot be verified, the executable instructions included in the tool package are not loaded into device 106 memory and are not executed. If the tool package 1600 has been verified as described above, the processor instructions enabling remote access to the device are loaded into device 106 memory and executed by the device as shown in block 1114, thus permitting remote access.

In one embodiment, the token data includes one or more passwords, and a remote user may log in to the device 106 using one or more of the passwords.

In one embodiment, the tool package is executed from random access memory (RAM) of the device, and the tool package is removed from RAM by the device. This may occur, for example upon device reboot, or by a delete command via an application program interface of the device 106.

Hardware Environment

Figure 17:
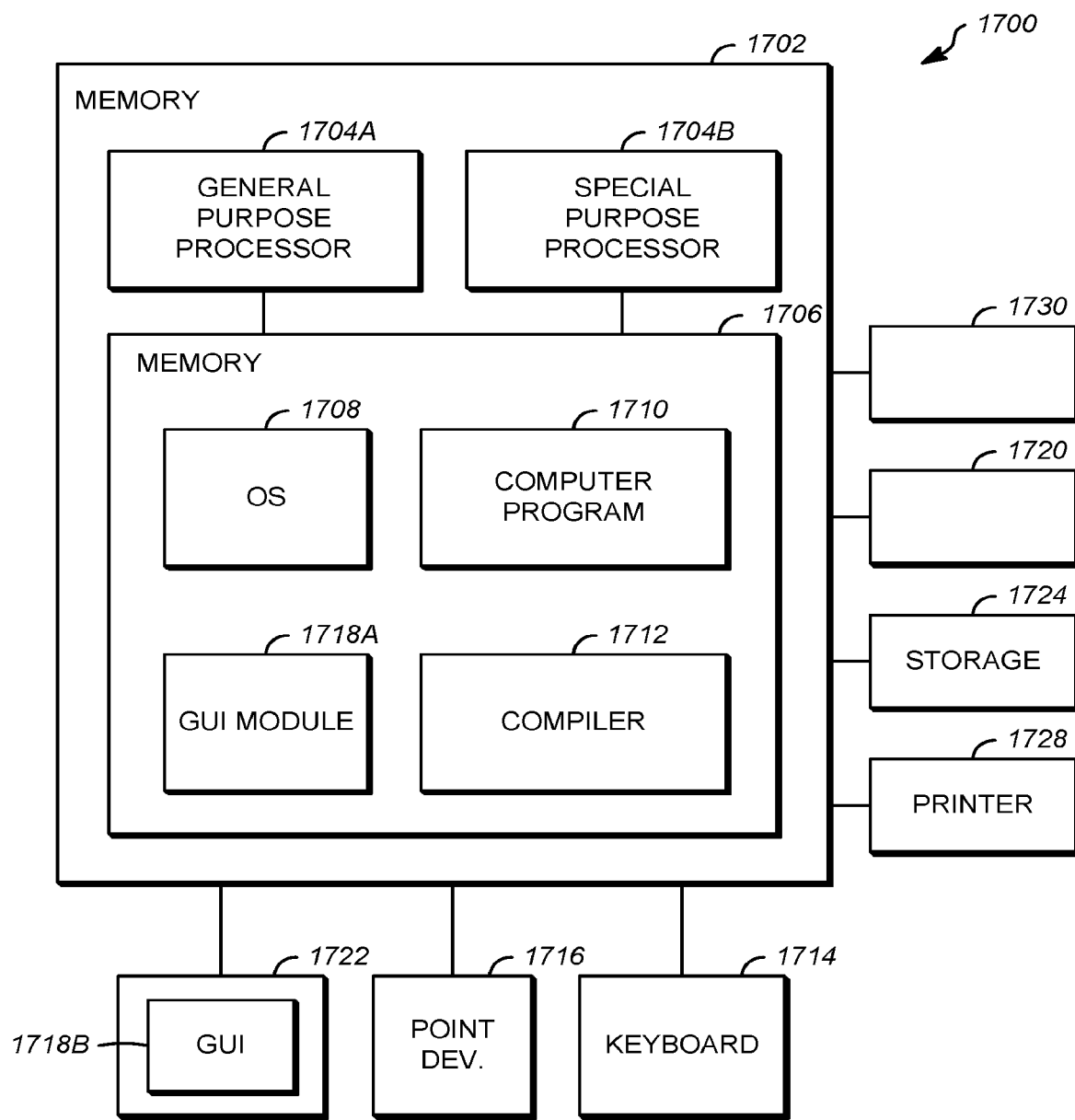
FIG. 17 is a diagram illustrating an exemplary computer system that could be used to implement elements of the present invention.

FIG. 17 is a diagram illustrating an exemplary computer system 1700 that could be used to implement elements of the present invention, including the CPE or modem 106, the OCM 306, the authentication server 304, the ACM 1002, and portions of the LAN 1004 and/or LAN interface 1006. The computer 1702 comprises a general-purpose hardware processor 1704A and/or a special purpose hardware processor 1704B (hereinafter alternatively collectively referred to as processor 1704) and a memory 1706, such as random-access memory (RAM). The computer 1702 may be coupled to other devices, including input/output (I/O) devices such as a keyboard 1714, a mouse device 1716 and a printer 1728.

In one embodiment, the computer 1702 operates by the general-purpose processor 1704A performing processor instructions defined by the computer program 1710 under control of an operating system 1708. The computer program 1710 and/or the operating system 1708 may be stored in the memory 1706 and may interface with the user and/or other devices to accept input and commands and, based on such input and commands and the instructions defined by the computer program 1710 and operating system 1708 to provide output and results.

Output/results may be presented on the display 1722 or provided to another device for presentation or further processing or action. In one embodiment, the display 1722 comprises a liquid crystal display (LCD) having a plurality of separately addressable pixels formed by liquid crystals. Each pixel of the display 1722 changes to an opaque or translucent state to form a part of the image on the display in response to the data or information generated by the processor 1704 from the application of the instructions of the computer program 1710 and/or operating system 1708 to the input and commands. Other display 1722 types also include picture elements that change state in order to create the image presented on the display 1722. The image may be provided through a graphical user interface (GUI) module 1718A. Although the GUI module 1718A is depicted as a separate module, the instructions performing the GUI 1718B functions can be resident or distributed in the operating system 1708, the computer program 1710, or implemented with special purpose memory and processors.

Some or all of the operations performed by the computer 1702 according to the computer program 1710 instructions may be implemented in a special purpose processor 1704B. In this embodiment, some or all of the computer program 1710 instructions may be implemented via firmware instructions stored in a read only memory (ROM), a programmable read only memory (PROM) or flash memory within the special purpose processor 1704B or in memory 1706. The special purpose processor 1704B may also be hardwired through circuit design to perform some or all of the operations to implement the present invention. Further, the special purpose processor 1704B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1702 may also implement a compiler 1712 which allows an application program 1710 written in a programming language such as COBOL, C++, FORTRAN, or other language to be translated into processor 1704 readable code. After completion, the application or computer program 1710 accesses and manipulates data accepted from I/O devices and stored in the memory 1706 of the computer 1702 using the relationships and logic that was generated using the compiler 1712.

The computer 1702 also optionally comprises an external communication device such as a modem, satellite link, Ethernet card, or other device for accepting input from and providing output to other computers.

In one embodiment, instructions implementing the operating system 1708, the computer program 1710, and/or the compiler 1712 are tangibly embodied in a computer-readable medium, e.g., data storage device 1720, which could include one or more fixed or removable data storage devices, such as a zip drive, floppy disc drive 1724, hard drive, CD-ROM drive, tape drive, or a flash drive. Further, the operating system 1708 and the computer program 1710 are comprised of computer program instructions which, when accessed, read and executed by the computer 1702, causes the computer 1702 to perform the steps necessary to implement and/or use the present invention or to load the program of instructions into a memory, thus creating a special purpose data structure causing the computer to operate as a specially programmed computer executing the method steps described herein. Computer program 1710 and/or operating instructions may also be tangibly embodied in memory 1706 and/or data communications devices 1730, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1702.

Although the term "computer" is referred to herein, it is understood that the computer may include portable devices such as cellphones, portable MP3 players, video game consoles, notebook computers, pocket computers, or any other device with suitable processing, communication, and input/output capability.

To the extent that terms "includes," "including," "has," "contains," and variants thereof are used herein, such terms are intended to be inclusive in a manner similar to the term "comprises" as an open transition word without precluding any additional or other elements. The term "exemplary" is used herein to mean serving as an example, instance, or illustration and is not necessarily to be construed as preferred or advantageous.

The foregoing discloses an apparatus, method and system for providing remote access to a device including a processor. One embodiment is evidenced by receiving an automatically expiring authentication token having encrypted authentication token data including a session key from the device; transmitting the authentication token to secure facility; receiving the decrypted authentication token data from the secure facility; signing a tool package with a package verification key derived at least in part from the session key, providing the signed tool package to the device wherein the device verifies the signed tool package using the package verification key and executes the tool package only if the signature of the tool package is verified. The tool package includes processor instructions providing remote access to the device when executed by the processor.

Implementations may include one or more of the following features:

Any of the methods described above, further including deriving the package verification key, including: generating a first value K1 from a hash of the session key; generating a second value K2 from a hash of the first value K1; and generating the package verification key from a concatenation of the first value K1 and the second value K.

Any of the methods described above, wherein the first value K1 includes a least significant part of the package verification key and the second value K2 includes a most significant part of the package verification key.

Any of the methods described above, wherein signing a tool package with the package verification key derived at least in part from the session key includes: generating a hash of the tool package; generating a manifest having the hash of the tool package; generating a signature of the manifest using the package verification key; appending the signature of the manifest to the manifest; and appending the tool package to the manifest.

Any of the methods described above, wherein the automatically expiring encrypted authentication token is generated by the device, by: generating, by the device, token data including: the session key; validity period, the authentication token being only valid during the validity period. The method may also include storing the token data in trusted storage of the device.

Any of the methods described above, including encrypting, by the device, the token data according to a random symmetric key (AEK) generated by the device.

Any of the methods described above, including encrypting the AEK with a public key associated with a private key securely stored in a remote facility.

Any of the methods described above, including generating the authentication token having the encrypted AEK and the encrypted token data.

Any of the methods described above, wherein the token data further includes one or more passwords; and the method further includes: enabling logging in to the device by providing the one or more passwords.

Any of the methods described above, wherein a new AEK is generated by the device each time a new encrypted authentication token is generated.

Any of the methods described above, wherein the public key is received in a configuration file and stored in the trusted storage.

Any of the methods described above, further including receiving a configuration file; determining if the configuration file includes the public key; if the received configuration file does not include the public key, disabling login access to the device; if the received configuration file includes the public key, comparing the public key in the received configuration file with a public key stored in trusted storage of the device; if public key in storage is different than public key in configuration file, replace public key in trusted storage of the device with public key of configuration file and regenerate authentication token.

Any of the methods described above, wherein the device includes a processor and a memory storing a firmware image having instructions for performing processor operations; and the public key is stored in the firmware image.

Any of the methods described above wherein the tool package executed from a random access memory (RAM) communicatively coupled to the processor; and the method further includes removing the tool package from the RAM.

Any of the methods described above, wherein removing the tool package from RAM includes determining if the device has been rebooted; and if the device has been rebooted, removing the tool package from RAM.

Any of the methods described above, wherein the tool package is removed by a delete command via an application program interface of the device.

Another embodiment is evidenced by an apparatus for providing remote access to a device. The apparatus includes a processor, including: a first processor, a memory, communicatively coupled to the first processor, the memory storing first processor instructions including instructions for: receiving an automatically expiring authentication token having encrypted authentication token data including a session key from the device, transmitting the authentication token to secure facility, receiving the decrypted authentication token data from the secure facility, signing a tool package with a package verification key derived at least in part from the session key, the tool package including device processor instructions providing remote access to the device when executed by the device processor, providing the signed tool package to the device, wherein the device: verifies the signed tool package using the package verification key, and executes the tool package only if the signature of the tool package is verified.

Implementations may include one or more of the following features:

Any apparatus described above, wherein the instructions further include deriving the package verification key, including instructions for: generating a first value K1 from a hash of the session key; generating a second value K2 from a hash of the first value K1; and generating the package verification key from a concatenation of the first value K1 and the second value K.

Any apparatus described above, wherein the first value K1 includes a least significant part of the package verification key and the second value K2 includes a most significant part of the package verification key.

Any apparatus described above, wherein the instructions for signing a tool package with the package verification key derived at least in part from the session key includes instructions for: generating a hash of the tool package; generating a manifest having the hash of the tool package; generating a signature of the manifest using the package verification key; appending the signature of the manifest to the manifest; and appending the tool package to the manifest.

Any apparatus described above, wherein the instructions for automatically expiring encrypted authentication token is generated by the device by generating, by the device, token data including: the session key; validity period, the authentication token being only valid during the validity period. The apparatus may also include instructions for storing the token data in trusted storage of the device.

Any apparatus described above, wherein the instructions include instructions for encrypting, by the device, the token data according to a random symmetric key (AEK) generated by the device.

Any apparatus described above, wherein the instructions include instructions for encrypting the AEK with a public key associated with a private key securely stored in a remote facility.

Any apparatus described above, wherein the instructions include instructions for generating the authentication token having the encrypted AEK and the encrypted token data.

Any apparatus described above, wherein the token data further includes one or more passwords; and the instructions include instructions for further includes: enabling logging in to the device by providing the one or more passwords.

Any apparatus described above, wherein a new AEK is generated by the device each time a new encrypted authentication token is generated.

Any apparatus described above, wherein the public key is received in a configuration file and stored in the trusted storage.

Any apparatus described above, wherein the instructions include instructions for receiving a configuration file; determining if the configuration file includes the public key; if the received configuration file does not include the public key, disabling login access to the device; if the received configuration file includes the public key, comparing the public key in the received configuration file with a public key stored in trusted storage of the device; if public key in storage is different than public key in configuration file, replace public key in trusted storage of the device with public key of configuration file and regenerate authentication token.

Any apparatus described above, wherein the memory stores a firmware image having instructions for performing processor operations; and the public key is stored in the firmware image.

Any apparatus described above wherein the tool package executed from a random access memory (RAM) communicatively coupled to the processor; and the method further includes removing the tool package from the RAM.

Any apparatus described above, wherein the instructions for removing the tool package from RAM includes determining if the device has been rebooted; and if the device has been rebooted, removing the tool package from RAM.

Any apparatus described above, wherein the tool package is removed by a delete command via an application program interface of the device.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of providing remote access to a device comprising a processor, comprising:
    receiving an automatically expiring authentication token having encrypted authentication token data including a session key from the device;
    transmitting the authentication token to secure facility;
    receiving the decrypted authentication token data from the secure facility;
    signing a tool package with a package verification key derived at least in part from the session key, the tool package comprising processor instructions providing remote access to the device when executed by the processor;
    providing the signed tool package to the device; and
    wherein the device:
        verifies the signed tool package using the package verification key; and
        executes the tool package only if the signature of the tool package is verified.

2. The method of claim 1, further comprising deriving the package verification key, comprising:
    generating a first value K1 from a hash of the session key;
    generating a second value K2 from a hash of the first value K1; and
    generating the package verification key from a concatenation of the first value K1 and the second value K2.

3. The method of claim 2, wherein the first value K1 comprises a least significant part of the package verification key and the second value K2 comprises a most significant part of the package verification key.

4. The method of claim 3, wherein signing a tool package with the package verification key derived at least in part from the session key comprises:
    generating a hash of the tool package;
    generating a manifest having the hash of the tool package;
    generating a signature of the manifest using the package verification key;
    appending the signature of the manifest to the manifest; and
    appending the tool package to the manifest.

5. The method of claim 1, wherein:
    the automatically expiring encrypted authentication token is generated by the device, by:
        generating, by the device, token data comprising:
            the session key; and
            validity period, the authentication token being only valid during the validity period;
        storing the token data in trusted storage of the device;
        encrypting, by the device, the token data according to a random symmetric key (AEK) generated by the device;
        encrypting the AEK with a public key associated with a private key securely stored in a remote facility; and
        generating the authentication token having the encrypted AEK and the encrypted token data.

6. The method of claim 1, wherein:
    the tool package executed from a random access memory (RAM) communicatively coupled to the processor; and
    the method further comprises removing the tool package from the RAM.

7. The method of claim 6, wherein removing the tool package from RAM occurs upon a reboot of the device.

8. The method of claim 6, wherein the tool package is removed by a delete command via an application program interface of the device.

9. The method of claim 5, wherein:
    the token data further comprises one or more passwords; and
    the method further comprises:
        enabling logging in to the device by providing the one or more passwords.

10. The method of claim 5 wherein
    a new AEK is generated by the device each time a new encrypted authentication token is generated.

11. The method of claim 5, wherein:
    the public key is received in a configuration file and stored in the trusted storage.

12. The method of claim 11, further comprising:
    receiving a configuration file;
    determining if the configuration file includes the public key;
    if the received configuration file does not include the public key, disabling login access to the device;
    if the received configuration file includes the public key, comparing the public key in the received configuration file with a public key stored in trusted storage of the device; and
    if public key in storage is different than public key in configuration file, replace public key in trusted storage of the device with public key of configuration file and regenerate authentication token.

13. The method of claim 5, wherein:
    the device comprises a processor and a memory storing a firmware image having instructions for performing processor operations; and
    the public key is stored in the firmware image.

14. An apparatus for providing remote access to a device comprising a processor, comprising:
    a first processor;
    a memory, communicatively coupled to the first processor, the memory storing first processor instructions comprising instructions for:
    receiving an automatically expiring authentication token having encrypted authentication token data including a session key from the device;
    transmitting the authentication token to secure facility;
    receiving the decrypted authentication token data from the secure facility;
    signing a tool package with a package verification key derived at least in part from the session key, the tool package comprising device processor instructions providing remote access to the device when executed by the device processor;
    providing the signed tool package to the device; and
    wherein the device:
        verifies the signed tool package using the package verification key; and
        executes the tool package only if the signature of the tool package is verified.

15. The apparatus of claim 14, wherein the first processor instructions further comprise instructions for deriving the package verification key, comprising first processor instructions for:

generating a first value K1 from a hash of the session key;
generating a second value K2 from a hash of the first value K1; and
generating the package verification key from a concatenation of the first value K1 and the second value K2.

16. The apparatus of claim 15, wherein the first value K1 comprises a least significant part of the package verification key and the second value K2 comprises a most significant part of the package verification key.

17. The apparatus of claim 16, wherein the first processor instructions for signing a tool package with the package verification key derived at least in part from the session key comprise first processor instructions for:
generating a hash of the tool package;
generating a manifest having the hash of the tool package;
generating a signature of the manifest using the package verification key;
appending the signature of the manifest to the manifest; and
appending the tool package to the manifest.

18. The apparatus of claim 14, wherein: the tool package executed from a random access memory (RAM) communicatively coupled to the processor; and the device processor instructions further comprise device processor instructions for removing the tool package from the RAM.

19. A non-transitory computer-readable memory of an apparatus storing one or more instructions for providing remote access to a device, the one or more instructions when executed by a processor of the apparatus cause the apparatus to perform one or more operations comprising:

receiving an automatically expiring authentication token having encrypted authentication token data including a session key from the device;
transmitting the authentication token to secure facility;
receiving the decrypted authentication token data from the secure facility;
signing a tool package with a package verification key derived at least in part from the session key, the tool package comprising processor instructions providing remote access to the device when executed by the processor;
providing the signed tool package to the device;
verifying the signed tool package using the package verification key; and
executing the tool package only if the signature of the tool package is verified.

20. The apparatus of claim 14, wherein:
the automatically expiring encrypted authentication token is generated by the device, by:
generating, by the device, token data comprising:
session key; and
validity period, the authentication token being only valid during the validity period;
storing the token data in trusted storage of the device;
encrypting, by the device, the token data according to a random symmetric key (AEK) generated by the device;
encrypting the AEK with a public key associated with a private key securely stored in a remote facility; and
generating the authentication token having the encrypted AEK and the encrypted token data.

* * * * *